United States Patent
Youn et al.

(10) Patent No.: US 11,109,280 B2
(45) Date of Patent: *Aug. 31, 2021

(54) METHOD FOR PDU SESSION ESTABLISHMENT PROCEDURE AND AMF NODE

(71) Applicant: LG Electronics Inc., Seoul (KR)

(72) Inventors: Myungjune Youn, Seoul (KR); Laeyoung Kim, Seoul (KR); Jaehyun Kim, Seoul (KR); Hyunsook Kim, Seoul (KR); Jinsook Ryu, Seoul (KR); Sangmin Park Park, Seoul (KR)

(73) Assignee: LG Electronics Inc., Seoul (KR)

( * ) Notice: Subject to any disclaimer, the term of this patent is extended or adjusted under 35 U.S.C. 154(b) by 20 days.

This patent is subject to a terminal disclaimer.

(21) Appl. No.: 16/535,623

(22) Filed: Aug. 8, 2019

(65) Prior Publication Data

US 2019/0364463 A1 Nov. 28, 2019

Related U.S. Application Data

(63) Continuation of application No. 16/055,957, filed on Aug. 6, 2018, now Pat. No. 10,419,979, which is a continuation of application No. PCT/KR2018/004255, filed on Apr. 11, 2018.

(Continued)

(30) Foreign Application Priority Data

Mar. 27, 2018 (KR) .................. 10-2018-0034808

(51) Int. Cl.
*H04W 36/00* (2009.01)
*H04W 40/24* (2009.01)
(Continued)

(52) U.S. Cl.
CPC ..... *H04W 36/0011* (2013.01); *H04L 63/0272* (2013.01); *H04L 63/0869* (2013.01);
(Continued)

(58) Field of Classification Search
CPC ......... H04W 36/0011; H04W 12/0602; H04W 76/18; H04W 36/00; H04W 40/24;
(Continued)

(56) References Cited

U.S. PATENT DOCUMENTS 9,967,801 B2   5/2018  Byun
10,419,979 B2* 9/2019  Youn ................ H04W 12/0602
(Continued)

FOREIGN PATENT DOCUMENTS

CN   101686563   3/2010
CN   103250390   8/2013
(Continued)

OTHER PUBLICATIONS

3GPP;Technical Specification Group Services and System Aspects; Procedures for the 5G System; Stage 2; (Release 15), 3GPP TS 23.502 V0.2.0, 1-71, Feb. 24, 2017.
(Continued)

*Primary Examiner* — Steven H Nguyen
(74) *Attorney, Agent, or Firm* — Fish & Richardson P.C.

(57) ABSTRACT

Provided is a method for handling a packet data unit (PDU) session establishment procedure. The method may performed by an access and mobility management function (AMF) node and comprise: determining whether to reject a PDU session establishment request. The determination may be performed if the PDU session establishment request includes an existing PDU session identifier. Based on the existing PDU session identifier, an identifier of a session management function (SMF) node may be acquired. The PDU session establishment request may be accepted, if it is
(Continued)

determined based the identifier of the SMF node that the SMF node and the AMF node belong to a same PLMN. The PDU session establishment request may be further accepted, if it is determined based the identifier of the SMF node that the SMF node belongs to a HPLMN. The PDU session establishment request may be rejected, if it is determined based on the identifier of the SMF node that the SMF node and the AMF node do not belong to the same PLMN or the SMF node does not belong to the HPLMN.

20 Claims, 21 Drawing Sheets

Related U.S. Application Data

(60) Provisional application No. 62/581,036, filed on Nov. 3, 2017, provisional application No. 62/489,996, filed on Apr. 25, 2017, provisional application No. 62/486,982, filed on Apr. 19, 2017.

(51) Int. Cl.

| | |
|---|---|
| *H04W 76/12* | (2018.01) |
| *H04W 76/18* | (2018.01) |
| *H04L 29/06* | (2006.01) |
| *H04W 12/06* | (2021.01) |
| *H04W 36/14* | (2009.01) |
| *H04W 60/00* | (2009.01) |

(52) U.S. Cl.
CPC ....... *H04W 12/0602* (2019.01); *H04W 36/00* (2013.01); *H04W 40/24* (2013.01); *H04W 76/12* (2018.02); *H04W 76/18* (2018.02); *H04W 36/0079* (2018.08); *H04W 36/14* (2013.01); *H04W 60/00* (2013.01)

(58) Field of Classification Search
CPC . H04W 76/12; H04W 36/0079; H04W 36/14; H04W 60/00; H04W 76/11; H04W 36/0022; H04W 80/10; H04L 63/0272; H04L 63/0869
See application file for complete search history.

(56) References Cited

U.S. PATENT DOCUMENTS

| | | | |
|---|---|---|---|
| 2014/0146753 | A1 | 5/2014 | Bergstrom et al. |
| 2017/0339609 | A1 | 11/2017 | Youn |
| 2018/0199398 | A1 | 7/2018 | Dao et al. |
| 2018/0227743 | A1* | 8/2018 | Faccin .................. H04W 76/10 |
| 2018/0376444 | A1* | 12/2018 | Kim ..................... H04W 4/70 |

FOREIGN PATENT DOCUMENTS

| | | |
|---|---|---|
| CN | 106851856 | 6/2017 |
| CN | 107690161 | 2/2018 |
| RU | 2602341 | 11/2016 |

OTHER PUBLICATIONS

Catt, 'Handover consideration for 5G', S2-171048, SA WG2 Meeting #119, Dubrovnik, Croatia, 1-5, Feb. 7, 2017.
Samsung, 'PDU Session Establishment procedure update with DN authorization', S2-171160, SA WG2 Meeting #119, Dubrovnik, Croatia, 1-6, Feb. 7, 2017.
Korean Notice of Allowance in Korean Application No. 10-2018-7037555, dated Jul. 1, 2019, 2 pages.
3rd Generation Partnership Project; Technical Specification Group Services and System Aspects; Procedures for the 5G System; Stage 2 (Release 15), "3GPP TS 23.502 V0.3.0," Mar. 2017, 115 pages.
LG Electronics, 'TS 23.502: Handover procedure from 3GPP access to untrusted non-3GPP access', S2-170999, SA WG2 Meeting #119, Dubrovnik, Croatia, 1-3, Feb. 7, 2017.
Notice of Allowance in Russian Appln. No. 2019100104/07, dated May 22, 2020, 26 pages (with English translation).
Cisco Systems, Inc., "Selecting a common PCF for UE and Session Policies," S2-180997, 3GPP TSG-SA2 Meeting #125, dated Jan. 25, 2018, 7 pages.
Extended European Search Report for European Application No. 18787804.6, dated Dec. 18, 2019, 15 pages.
Huawei HiSilicon, "Comparison of the options for session ID allocation and routing of subsequent SM signalling", S2-167000, SA WG2 Meeting #118, dated Nov. 21, 2016, 8 pages.
Huawei, HiSilicon, "Roaming mode consideration for HO procedure between 3GPP access and non-3GPP access," S2-179551, 3GPP TSG SA WG2 Meeting #124, dated Dec. 4, 2017, 11 pages.
LG Electronics, "Discussion on Handover between 3GPP and N3GPP via different PLMN," S2-178614, dated Nov. 27-Dec. 1, 2017, 15 pages.
LG Electronics, "TS 23.501: update of clause 5.6.3 Roaming—fallback from LBO to home-routed," S2-172116, dated Mar. 31, 2017, 4 pages.
Nokia, Nokia Shanghai Bell, Verizon, "Inability to route a 5GSM message forwarding to SMF in non-V/HPLMN," C1-181782, 3GPP TSG-CT WG1 Meeting #109, dated Mar. 2, 2018, 5 pages.
Catt, "Update of PDU session establishment procedure," S2-172136, 3GPP TSG SA WG2 Meeting #120, Busan, Korea, dated Mar. 27-31, 2017, 8 pages.
Ericsson, "P-CR on PDU Session establishment procedure and message coding," C1-171961, 3GPP TSG-CT WG1 Meeting #103, 3GPP TSG-CT WG1 Meeting #103, dated Apr. 3-7, 2017, 3 pages.
Ericsson, "23.502: Handover between 3GPP and non-3GPP access," S2-171752, SA WG2 Meeting #120, SA WG2 Meeting #120, 8 pages.
European Office Action in European Appln. No. 18787804.6, dated Sep. 28, 2020, 8 pages.
Chinese Office Action in CN Appln. No. 201880017152.9, dated Jan. 28, 2021, 15 pages (with English translation).
Huawei, HiSilicon, "Reflective QoS Timer transmission during PDU Session establishment," S2-181570, 3GPP TSG-SA2 Meeting #126, Montreal, Canada, Feb. 26-Mar. 2, 2018, 13 pages.
Nokia, Nokia Shanghai Bell, Verizon, "Inability to route a 5GSM message forwarding to SMF in non-V/HPLMN," Cl-181421, 3GPP TSG-CT WG1 Meeting#109, Montreal, Canada, Feb. 26-Mar. 2, 2018, 5 pages.
CN Notice of Allowance in Chinese Appln. No. 201880017152.9, dated Jun. 1, 2021, 8 pages (with English translation).

* cited by examiner

METHOD FOR PDU SESSION ESTABLISHMENT PROCEDURE AND AMF NODE

CROSS-REFERENCE TO RELATED APPLICATIONS

This application is a continuation of U.S. application Ser. No. 16/055,957, filed on Aug. 6, 2018, now allowed, which is a continuation of International Application PCT/KR2018/004255, with an international filing date of Apr. 11, 2018, which claims the benefit of U.S. Provisional Patent Applications Nos. 62/486,982 filed on Apr. 19, 2017, 62/489,996 filed on Apr. 25, 2017, 62/581,036 filed on Nov. 3, 2017 and Korean Patent Application No. 10-2018-0034808 filed in the Korean Intellectual Property Office on Mar. 27, 2018, the contents of which are hereby incorporated by reference herein in their entirety.

BACKGROUND OF THE INVENTION

Field of the Invention

The present invention relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

FIG. 3a is an exemplary diagram illustrating an architecture for supporting a multiple PDU session through two data networks. FIG. 3b is an exemplary diagram illustrating an architecture for supporting a concurrent access through two data networks.

FIG. 3a illustrates an architecture that allows an UE to simultaneously access two data network using a multiple PDU session. Two SMFs may be selected for two different PDU sessions.

FIG. 3b illustrates an architecture that allows the UE to simultaneously access two data networks using one PDU session.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

<Roaming in Next Generation Mobile Communication Network>

Meanwhile, there are two schemes for handling a signaling request from the UE in a situation where the UE roams in a visited network, for example, Visited Public Land Mobile Network (VPLMN). A local break out (LBO) being a first scheme handles a signaling request from the UE by a visited network. According to a Home Routing (HR) being a second scheme, the visited network transfers a signaling request from the UE to a home network of the UE.

FIG. 4a is an exemplary diagram illustrating an architecture to which the LBO scheme is applied during roaming. FIG. 4b is an exemplary diagram illustrating an architecture to which the HR scheme is applied during roaming.

As shown in FIG. 4a, in an architecture to which the LBO scheme is applied, user data are transferred to a data network in a VPLMN. To this end, a PCF in the VPLMN performs interaction with an AF in order to generate a PCC rule for a service in the VPLMN. A PCF node in the VPLMN creates a PCC rule based on a policy set inside according to a roaming convention with a Home Public Land Mobile Network (HPLMN) businessman.

As shown in FIG. 4b, in the architecture to which the HR scheme is applied, data of the UE is transferred to a data network in the HPLMN.

<Data Bypass to Non-3GPP Network>

In the next generation mobile communication, the data of the UE may bypass to a non-3GPP network, for example, a Wireless Local Area Network (WLAN) or Wi-Fi.

FIG. 5a to FIG. 5f illustrate architectures for bypassing data to the non-3GPP net work.

The Wireless Local Area Network (WLAN) or Wi-Fi is regarded as the untrusted non-3GPP network. In order to access the non-3GPP network to a core network, a Non-3GPP InterWorking Function (N3IWF) may be added.

<Interworking with Existing 4 Generation (G) Mobile Communication System>

Although the UE escapes from coverage of a next generation Radio Access Network (RAN), the UE may receive a service through a 4 G mobile communication system. The above refers to interworking. Hereinafter, the interworking will be described in detail.

FIG. 6a illustrates an architecture for interworking when the UE does not roam, and FIG. 6b illustrates an architecture for interworking when the UE roams.

Referring to FIG. 6a, when the UE does not roam, an E-UTRAN and an EPC for existing 4G LTE and a 5G mobile communication network may interwork with each other. In FIG. 6a, a Packet data network Gateway (PGW) for an existing EPC is divided into a PGW-U being responsible for only a user plane and a PGW-C being a control plane. Further, the PGW-U merges with an UPF of a 5G core network. The PGW-C merges with an SMF of the 5G core network. In addition, a Policy and Charging Rules Function (PCRF) for an existing EPC may merge with a PCF of the 5G core network. An HSS for the existing EPC may merge with an UDM of the 5G core network. Although the UE may access a core network through the E-UTRAN, the UE may access a core network through a radio access network (RAN) and an AMF.

Referring to FIG. 6a and FIG. 6b to compare with each other, when the UE roams a Visited Public Land Mobile Network (VPLMN), the data of the UE are transferred through a Home PLMN (HPLMN).

Meanwhile, an N26 interface shown in FIG. 6a and FIG. 6b is an interface connected between an MME and an AMF for easy interworking between an EPC and an NG. The N26 interface may be selectively supported according to a businessman. That is, for interworking with an EPC, a network businessman may provide an N26 interface or may not provide the N26 interface.

During a roaming situation, the UE transmits a PDU session establishment request message to the network. If the UE receives a response thereto, the UE may know that the PDU session is established. However, the UE cannot know whether the PDU session is established in a Local Breakout (LBO) scheme or a Home Routed (HR) scheme. Accordingly, the handover may not be performed. However, since the UE cannot know whether or not a real handover can succeed. In this case, unnecessary signaling occurs.

SUMMARY OF THE INVENTION

The prevent invention has been made in an effort to solve the above-described problems.

To achieve the foregoing purposes, the disclosure of the present specification proposes a method for handling a packet data unit (PDU) session establishment procedure. The method may be performed by an access and mobility management function (AMF) node and comprise: determining whether to reject a PDU session establishment request. The determination may be performed if the PDU session establishment request includes an existing PDU session identifier. Based on the existing PDU session identifier, an identifier of a session management function (SMF) node may be acquired. The PDU session establishment request may be accepted, if it is determined based the identifier of the SMF node that the SMF node and the AMF node belong to a same PLMN. The PDU session establishment request may be further accepted, if it is determined based the identifier of the SMF node that the SMF node belongs to a HPLMN. The PDU session establishment request may be rejected, if it is determined based the identifier of the SMF node that the SMF node and the AMF node do not belong to the same PLMN or the SMF node does not belong to the HPLMN.

The PDU session establishment request message may further comprise a request type. The request type may indicate an "initial request" to configure a new PDU session, or the request type may indicate an "existing PDU session" where there is the existing PDU session.

When the request type indicates the "existing PDU session", movement of a PDU session may be requested between a 3rd Generation Partnership Project (3GPP) based access network and a non-3GPP based access network.

The AMF node may store an identifier of a PDU session and the identifier of the SMF node in connection with each other.

The identifier of the SMF node may comprise an identifier of a PLMN.

The method may further comprise: transmitting a message including a rejection cause when the PDU session establishment request is rejected.

To achieve the foregoing purposes, the disclosure of the present specification proposes an access and mobility management function (AMF) node for handling a packet data unit (PDU) session establishment procedure. The AMF node may comprise: a transceiver; and a processor to control the transceiver, and to determine whether to reject a PDU session establishment request. The determination may be performed if the PDU session establishment request includes an existing PDU session identifier. Based on the existing PDU session identifier, an identifier of a session management function (SMF) node may be acquired. The PDU session establishment request may be accepted, if it is determined based the identifier of the SMF node that the SMF node and the AMF node belong to a same PLMN. The PDU session establishment request may be further accepted, if it is determined based the identifier of the SMF node that the SMF node belongs to a HPLMN. The PDU session establishment request may be rejected, if it is determined based the identifier of the SMF node that the SMF node and the AMF node do not belong to the same PLMN or the SMF node does not belong to the HPLMN.

According to the disclosure of the present invention, the problem of the conventional technology described above may be solved.

DESCRIPTION OF EXEMPLARY EMBODIMENTS

Figure 1:
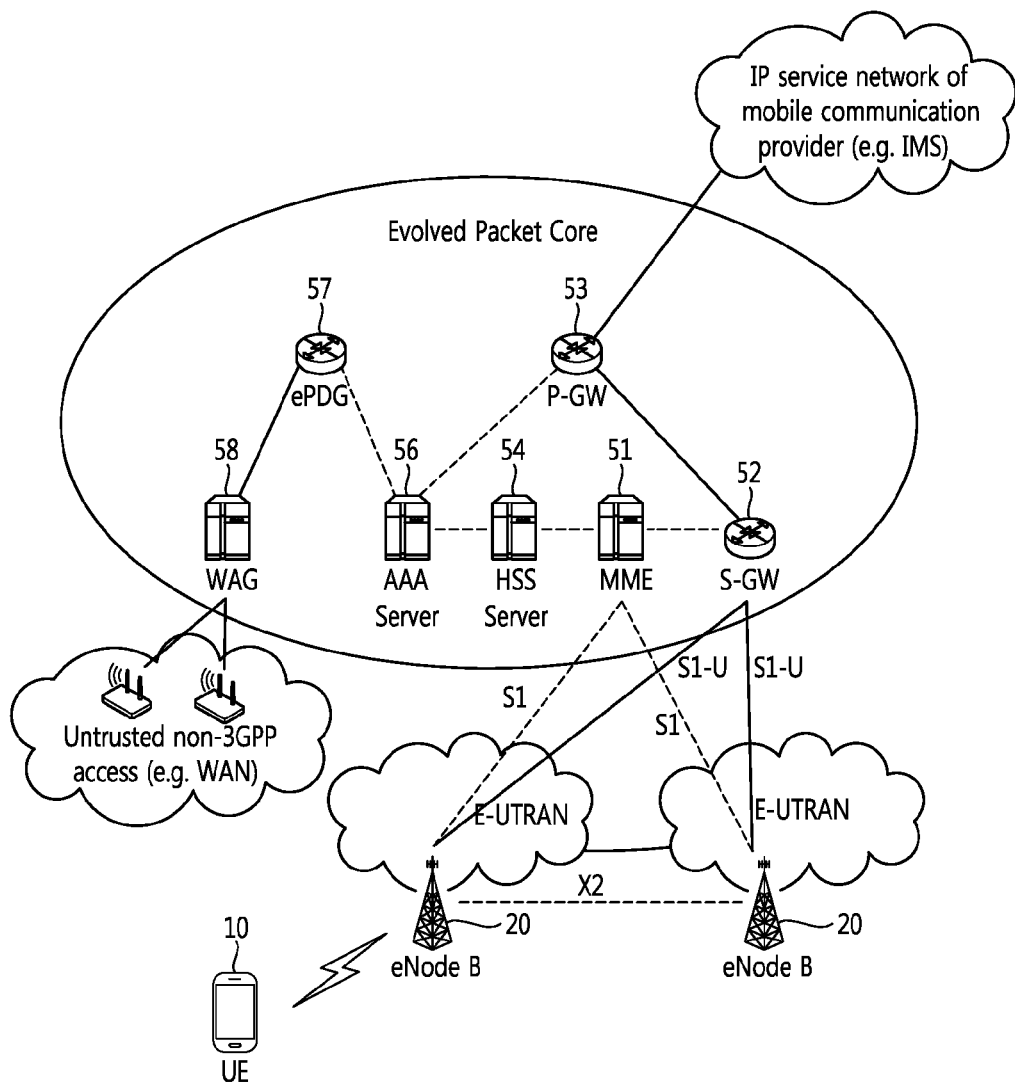
FIG. 1 shows the configuration of an evolved mobile communication network.
Figure 2:
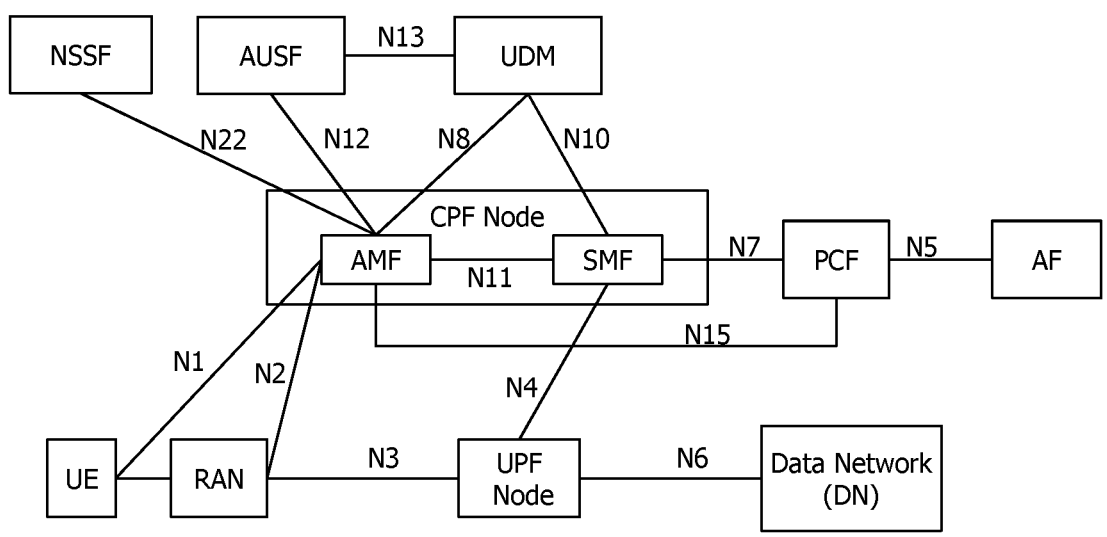
FIG. 2 is an exemplary diagram illustrating a predicted structure of a next generation mobile communication in terms of a node.
Figure 3A:
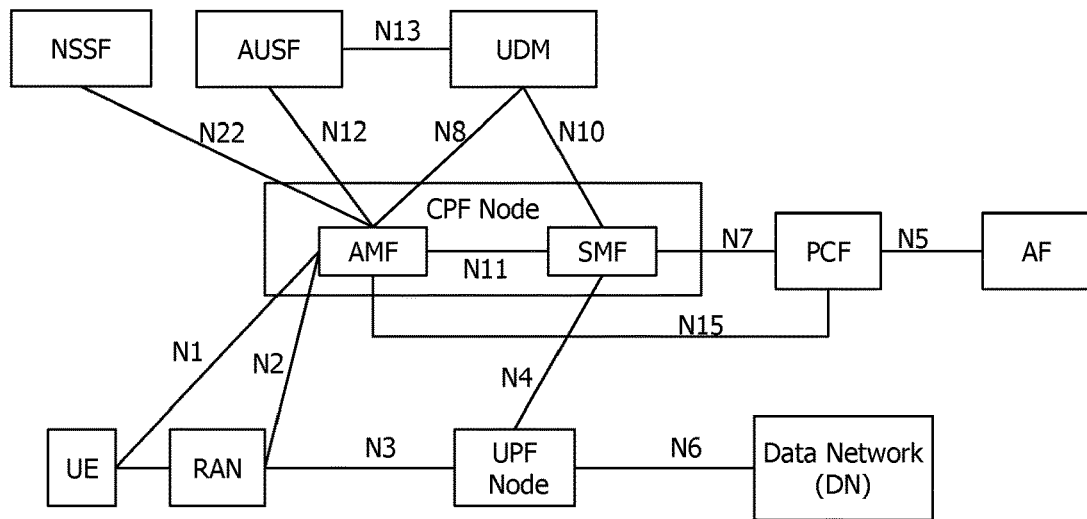
FIG. 3a is an exemplary diagram illustrating an architecture for supporting a multiple PDU session through two data networks.
Figure 3B:
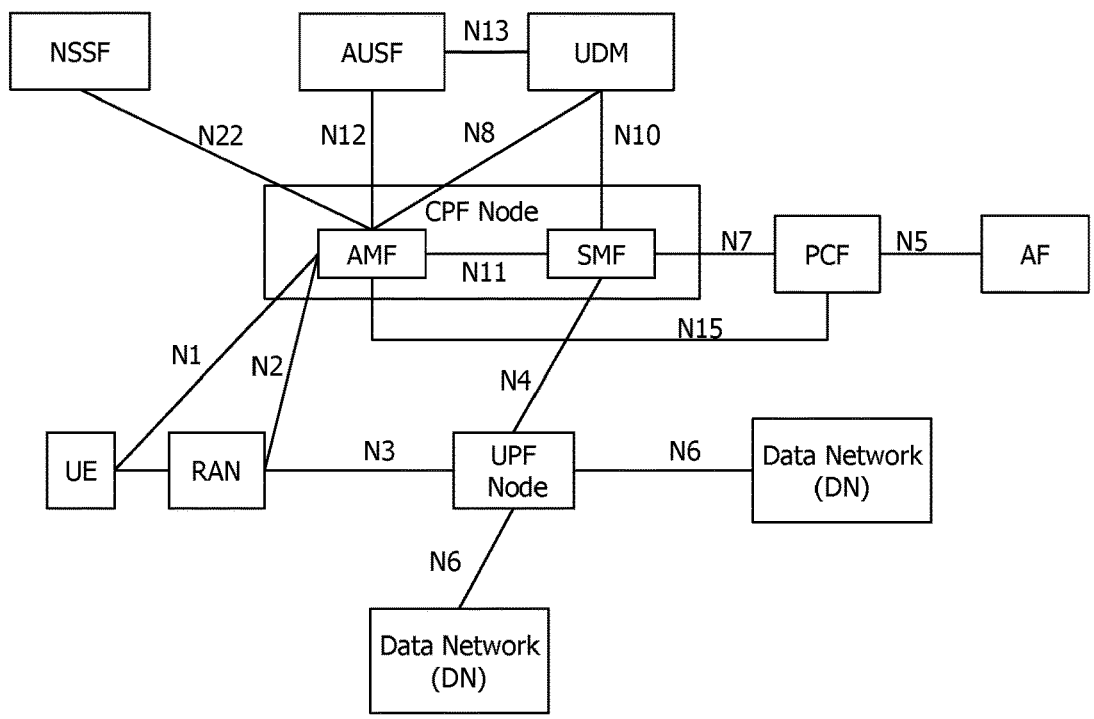
FIG. 3b is an exemplary diagram illustrating an architecture for supporting a concurrent access through two data networks.
Figure 4A:
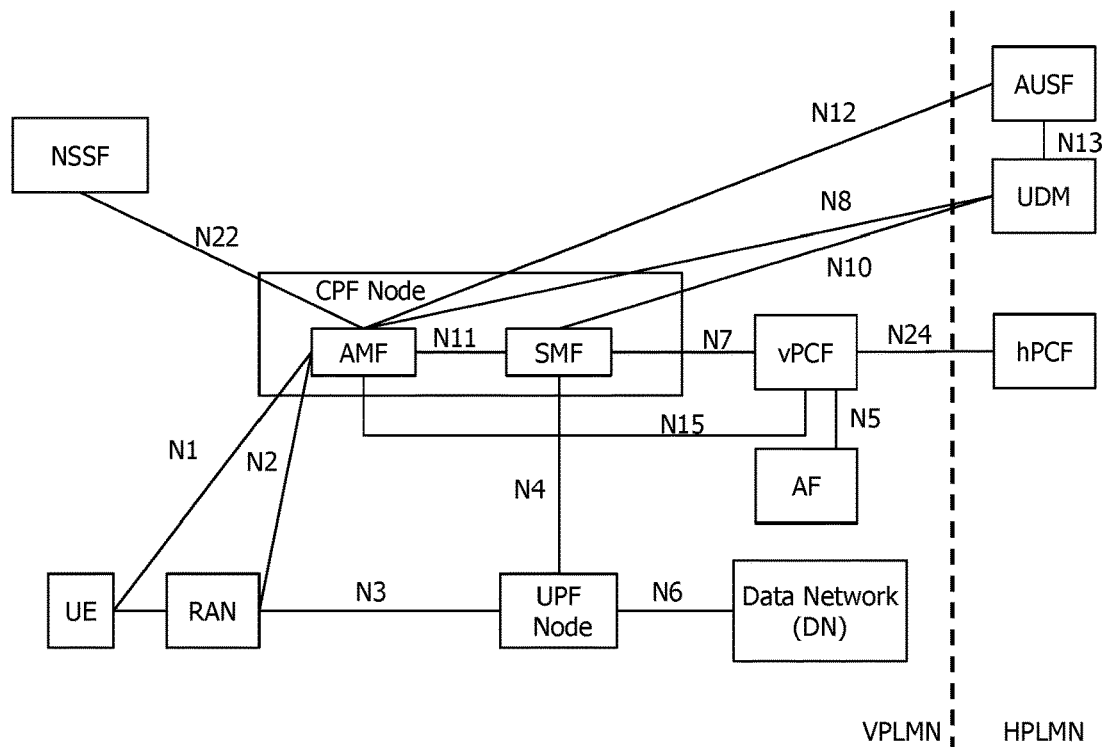
FIG. 4a is an exemplary diagram illustrating an architecture to which the LBO scheme is applied during roaming.
Figure 4B:
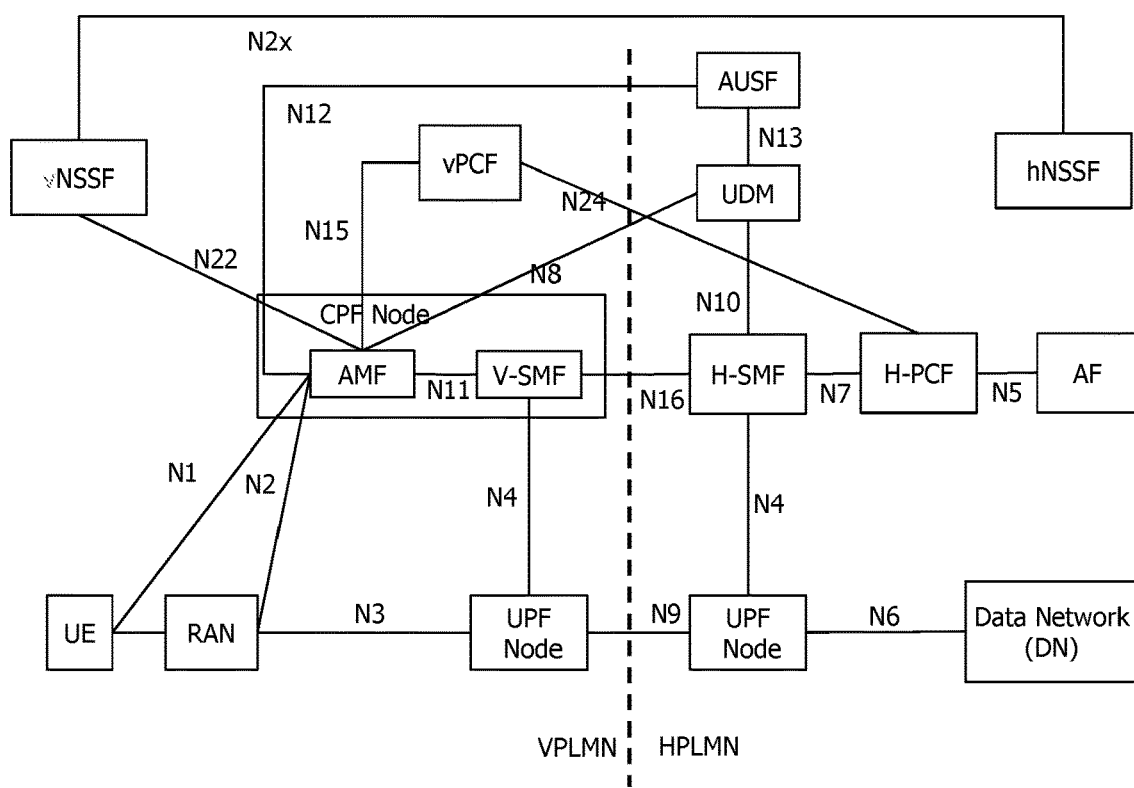
FIG. 4b is an exemplary diagram illustrating an architecture to which the HR scheme is applied during roaming.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply. The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

<Session and Service Continuity (SSC)>

A next generation mobile communication network provides various modes in order to support the SSC.

1) SSC Mode 1

An UPF functioning as a PDU session anchor during the PDU session establishment procedure is maintained regardless of an access technology (that is, access type and cell). In a case of an IP type PDU session, IP continuity is supported regardless of movement of the UE. The SSC mode 1 is applicable to a certain PDU session type and a certain access type.

2) SSC Mode 2

When the PDU session includes one PDU session anchor, the network triggers release of the PDU session, and may instruct the UE to establish the same PDU session. During an establishment procedure of the new PDU session, an UPF functioning as a PDU session anchor may be newly selected. The SSC mode 2 is applicable to a certain PDU session type and a certain access type.

3) SSC Mode 3

With respect to a PDU session regarding the SSC mode 3, the network may allow connection establishment of UE using a new PDU session with respect to the same data network before releasing connectivity between the UE and a previous PDU session anchor. When a trigger condition is applied, the network may determine whether to select a PDU session anchor, that is, UPF suitable for a new condition of the UE. The SSC mode 3 is applicable to a certain PDU session type and a certain access type.

4) Selection of SSC Mode

In order to determine a type of an SSC mode associated with an application or an application group of the UE, an SSC mode selection policy may be used.

The businessman may provide the SSC mode selection policy to the UE. The SSC mode selection policy may include at least one SSC mode selection policy rule.

<Registration Procedure>

The UE needs to obtain authorize to allow mobility tracking and data reception and to receive a service. To this end, the UE should register in the network. A registration procedure is performed when the UE needs to perform an initial registration with respect to a 5G system. Further, when the UE needs to perform a periodic registration update, to move a new tracking area (TA) in an idle mode, and to perform a periodic registration update, the registration procedure is performed.

During an initial registration procedure, an ID of the UE may be acquired from the UE. The AMF may transfer a PEI (IMEISV) to a UDM, an SMF, and a PCF.

Figure 7:
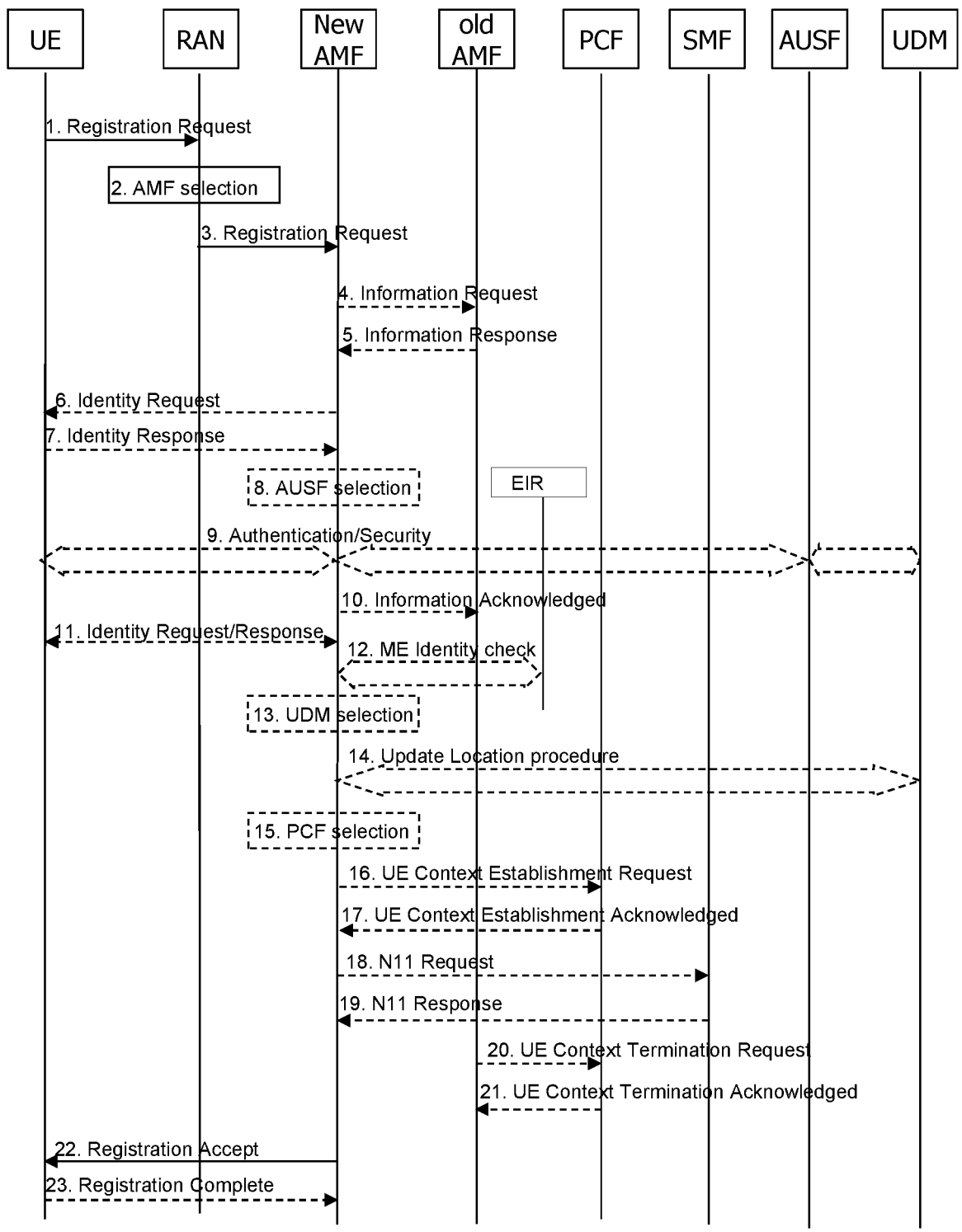
FIG. 7 is a flowchart illustrating an exemplary registration procedure.

FIG. 7 is a flowchart illustrating an exemplary registration procedure.

1) The UE may transmit an AN message to an RAN. The AN message may include AN parameters and a registration request message. The registration request message may include information such as a registration type, a subscriber permanent ID or a temporary user ID, a security parameter, an NSSAI, 5G ability of UE, PDU, and a PDU session state.

In a case of the 5G RAN, the AN parameter may include a SUPI or a temporary user ID, a selected network and an NSSAI.

The registration type may indicate whether UE is "initial registration" (that is, UE is in a non-registration state), "mobility registration update" (that is, UE is in a registered state to start the registration procedure due to mobility) or "regular registration update" (that is, UE is in a registered state to start the registration procedure due to periodic update timer expiration). When the temporary user ID is included, the temporary user ID indicates a final serving AMF. When the UE is previously registered through a non-3GPP access in a PLMN different from a PLMN of a 3GPP access, the UE may not provide an UE temporary ID assigned by an AMF during a registration procedure through a non-3GPP access.

The security parameter may be used for authentication and integrity protection.

The PDU session state represents a PDU session available (preset) in the UE.

2) When an SUPI is included or the temporary user ID does not represent a valid AMF, the RAN may select the AMF based on the (R)AT and the NSSAI.

When the (R)AN cannot select a suitable AMF, the UE selects a temporary AMF according to a local policy, and transfers a registration request to the selected AMF. When the selected AMF cannot serve the UE, the selected AMF selects another suitable AMF for UE.

3) The RAN transmits an N2 message to a new AMF. The N2 message includes an N2 parameter and a registration request. The registration request may include a registration type, a subscriber permanent identifier or a temporary use ID, a security parameter, an NSSAI, and an MICO mode basic setting.

When the 5G-RAN is used, the N2 parameter includes location information on a cell on which UE camps, cell identifier, and an RAT type.

If a registration type indicated by UE is periodic registration update, following procedures 4 to 17 may not be performed.

4) The newly selected AMF may transmit an information request message to a previous AMF.

When a temporary user ID of the UE is included in a registration request message and a serving AMF is changed after a final registration, the new AMF may transmit an information request message including complete registration request information to the previous AMF in order to request the SUPI and the MM context.

5) The previous AMF transmits an information response message to the newly selected AMF. The information response message may include the SUPI and the MM context, and SMF information.

In detail, the previous AMF transmits an information response message including the SUPI and MM context.

When the previous AM includes information on an active PDU session, the previous AMF may add SMF information including an ID and a PDU session ID of the SMF to the information response message.

6) When the SUPI is not provided by the UE or is not searched from the previous AMF, the new AMF transmit an Identity Request message to the UE.

7) The UE transmits an Identity Response message including the Identity Response to the new AMF.

8) The AMF may determine to trigger an AUSF. In this case, the AMF may select an AUSF based on the SUPI.

9) The AUSF may start authentication of the UE and NAS security function.

10) The new AMF may transmit an information response message to the previous AMF.

If the AMF is changed, the new AMF may transmit the information response message in order to confirm transfer of a UE MM context.

If authentication/security procedure fails, a registration is rejected and the new AMF may transmit a rejection message to the previous AMF.

11) The new AMF may transmit an Identity Request message to the UE.

When a PEI is not provided by the UE or the PEI is not searched from the previous AMF, the AMF may transmit an Identity Request message in order to search the PEI.

12) The new AMF tests an ME identifier.

13) If a procedure 14 to be described later is performed, the new AMF selects a UDM based on the SUPI.

14) If an AMF is changed after final registration, a valid subscription context with respect to the UE is not included in the AMF, or the UE provides the SUPI which does not refer to a valid context, the new AMF starts an update location procedure. Alternatively, the UDM starts a cancel location with respect to a previous AMF, the new AMF may start an update location procedure. The previous AMF removes the MM context to notify to all possible SMF(s). The new AMF obtains AMF relation subscription data from the UDM to generate an MM context with respect to the UE.

When network slicing is used, the AMF acquires an NSSAI allowed based on the requested NSSAI, UE subscription and local policy. If it is not suitable to support an NSSAI in which the AMF is allowed, the registration request is again routed.

15) The new AMF may select a PCF based on the SUPI.

16) The new AMF transmit a UE Context Establishment Request message to the PCF. The AMF may request an operator policy with respect to the UE to the PCF.

17) The PCF transmits a UE Context Establishment Acknowledged message to the new AMF.

18) The new AMF transmits an N11.

In detail, if the AMF is changed, the new AMF notifies a new AMF serving the UE to each SMF. The AMF verifies a PDU session state from the UE as available SMF information. When the AMF is changed, available SMF information may be received from the previous AMF. The new AMF may request to the SMF to release a network resource associated with a PDU session which is not activated in the UE.

19) The new AMF transmits a N11 response message to the SMF.

20) The previous AMF transmits a UE Context Termination Request message to the PCF.

When the previous AMF is previously requested so that a PDF PCF configures the UE context.

21) The PCF may transmit the UE Context Termination Request message to the previous AMF.

22) The new AMF transmits a registration accept message to the UE. The registration accept message may include a temporary user ID, a registration area, mobility limitation, a PDU session state, an NSSAI, a regular update timer and an allowed MICO mode.

When the AMF assigns a new temporary user ID, the temporary user ID may be further included in the registration accept message. When the mobility limitation is applied to the UE, information indicating the mobility limitation may be further included in the registration accept message. The AMF may add information indicating a PDU session state with respect to the UE to the registration accept message. The UE may remove a temporary internal resource associated with a PDU session which is not indicated as activation in the received PDU session state. If PDU session state information is included in a Registration Request, the AMF may add information indicating a PDU session state the UE to the registration accept message.

23) The UE transmits a registration complete message to the new AMF.

<PDU Session Establishment Procedure>

The PDU session establishment procedure may include two types of PDU session establishment procedures PDU session establishment procedure starting by UE PDU session establishment procedure starting by a network. To this end, the network may transmit a device trigger message to application(s) of the UE.

Figure 8:
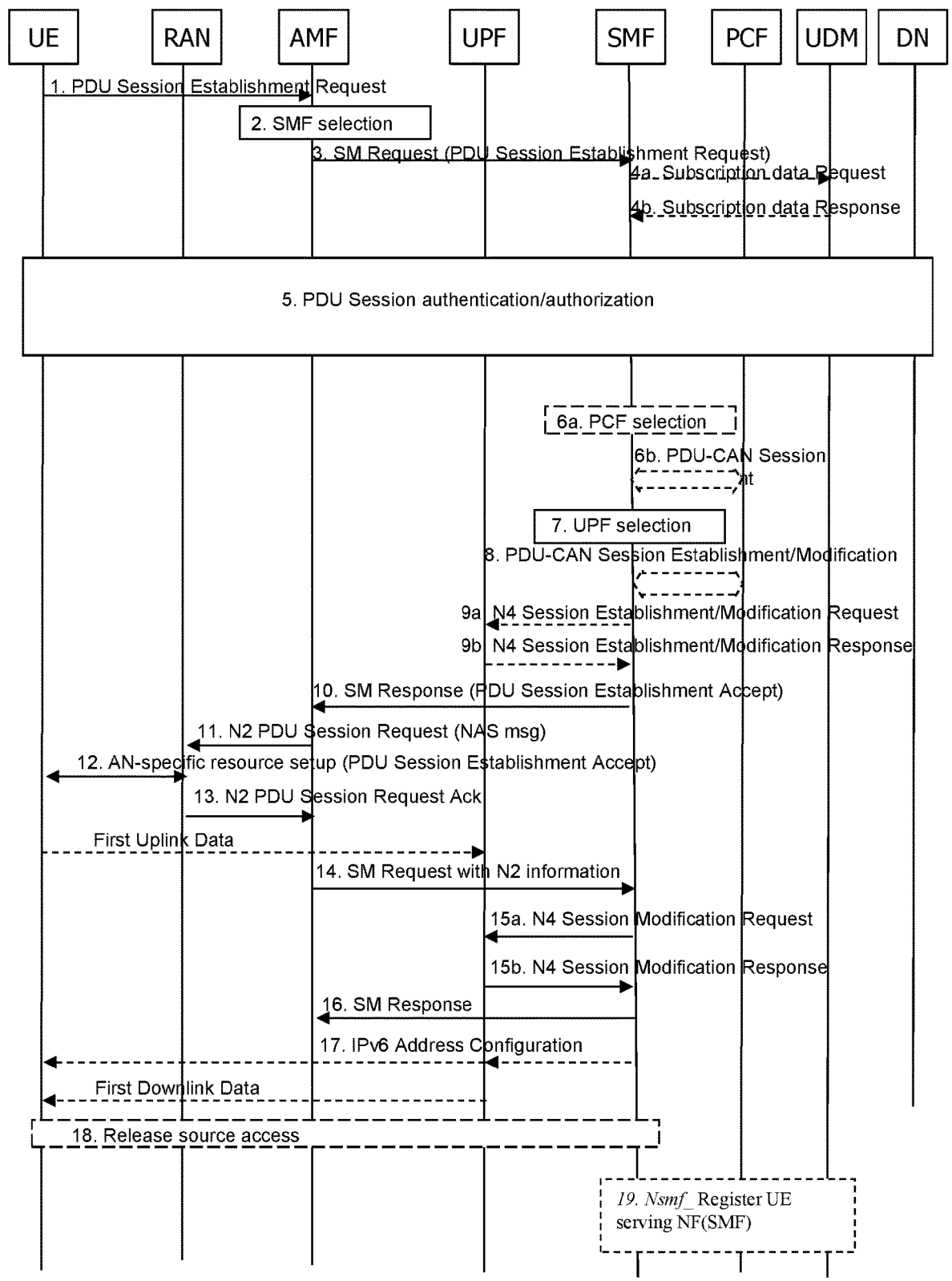
FIG. 8 is a flowchart illustrating an exemplary PDU session establishment procedure.

FIG. 8 is a flowchart illustrating an exemplary PDU session establishment procedure.

It is assumed in a procedure shown in FIG. 8 that the UE is previously registered on the AMF according to a registration procedure shown in FIG. 7. Accordingly, it is assumed that the AMF previously acquires user subscription data from the UDM.

1) The UE transmits an NAS message to the AMF. The message may include an S-NSSAI, a DNN, a PDU session ID, a request type, and N1 SM information.

In order to establish the new PDU session, the UE may create a new PDU session ID.

The UE may start a PDU session establishment procedure starting by the UE by transmitting an NAS message obtained by adding the PDU session establishment request message to N1 SM information. The PDU session establishment request message may include a request type, an SSC mode, and a protocol configuration option.

However, the PDU session establishment is to configure a new PDU session, a request type represents "initial request". However, when there is an existing PDU session between a 3GPP access and a non-3GPP access, the request type may represent "existing PDU session".

The NAS message transmitted by the UE is encapsulated in the N2 message by an AN. The N2 message is transmitted to the AMF, and may include user location information and access technology type information.

N1 SM information may include SM PDU DN request container including information on PDU session authentication by external DN.

2) The AMF may determine that a message corresponding to a request with respect to a new PDU session when the request type indicates "initial request" and the PDU session ID is not sued for an existing PDU session of UE and the PDU session ID is not used for an existing PDU session of the UE.

If the NAS message does not include the S-NSSAI, the AMF may determine a default S-NSSAI with respect to a requested PDU session according to UE subscription. The AMF may store a PDU session ID and an ID of an SMF in connection with each other.

3) The AMF transmits an SM request message to the SMF. The SM request message may include a subscriber permanent ID, a DNN, an S-NSSAI, a PDU session ID, an AMF ID, N1 SM information, user location information, and an access technology type. The N1 SM information may include a PDU session ID and a PDU session establishment request message.

The AMF ID is used to identify an AMF serving the UE. The N1 SM information may include a PDU session establishment request message received from the UE.

4a) The SMF transmits a subscriber data request message to the UDM. The subscriber data request message may include a subscriber permanent ID and a DNN.

During the procedure 3, when the request type indicates "existing PDU session, the SMF determines that a corresponding request is caused between a 3GPP access and a non-3GPP access. The SMF may identify an existing PDU session based on a PDU session ID.

When the SMF does not search SM relation subscription data with respect to the UE associated with the DNN yet, the SMF may request subscription data.

4b) The UDM may transmit the subscription data response data to the SMF.

The subscription data may include information on an authenticated request type, an authenticated SSC mode, and a basic QoS profile.

The SMF may configure whether a UE request complies with user subscription and local policy. Alternatively, the SMF rejects a UE request through NAS SM signaling (including related SM rejection cause), and reports that the PDU session ID is regarded to be released to the AMF.

5) The SMF transmits a message to a DN through a UPF.

In detail, when the SMF approves/authenticates a PDU session establishment, the SMF selects a UPF to trigger a PDU.

When the PDU session establishment authentication/right grant fails, the SMF finishes the PDU session establishment procedure to report rejection to the UE.

6a) if a dynamic PCC is distributed, the SMF selects the PCF.

6b) The SMF may start a PDU-CAN session establishment in a direction of the PCF in order to obtain a basic PCC rule with respect to a PDU session. If the request type during the procedure 3 represents the "existing PDU session", the PCF may start PDU-CAN session modification.

7) If the request type during the procedure 3 represents the "initial request", the SMF selects an SSC mode with respect to the PDU session. If a procedure 5 is not performed, the SMF may also select the UPF. In a case of the request type IPv4 or IPv6, the SMF may assign IP address/prefix with respect to a PDU session.

8) When a dynamic PCC is disposed and a PDU-CAN session establishment is not terminated yet, the SMF may starts a PDU-CAN session.

9) When the request type represents the "initial request" and the procedure 5 is not performed, the SMF starts an N4 session establish procedure using a selected UPF. Otherwise, the SMF may start an N4 session modification procedure using a selected UPF.

9a) The SMF transmits an N4 session establishment/modification request message to the UPF. Further, the SMF may provide packet detection, enforcement and report rule to be installed at the UPF with respect to the PDU. When the CN tunnel information is assigned to the SMF, the CN tunnel information may be provided to the UPF.

9b) The UPF may respond by transmitting the N4 session establishment/modification response message. When the CN tunnel information is assigned by the UPF, the CN tunnel information may be provided to the SMF.

10) The SMF transmits the SM response message to the AMF. The SM response message may include a cause, N2 SM information, and N1 SM information. The N2 SM information may include a PDU session ID, a QoS profile, and CN tunnel information. The N1 SM information may include a PDU session establishment accept message. The PDU session establishment accept message may include an allowed QoS rule, an SSC mode, an S-NSSAI, and an assigned IPv4 address.

The N2 SM information is information where the AMF should transfer to the RAN, and may include the following information.

CN tunnel information: The CN tunnel information corresponds to a core network address of a N3 tunnel corresponding to the PDU session.

QoS profile: The QoS profile is used to provide mapping between a QoS parameter and a QoS flow identifier to the RAN.

PDU session ID: The PDU session ID may be used to indicate a relationship between AN resources with respect to the UE and the PDU session by AN signaling with respect to the UE.

Meanwhile, the N1 SM information includes a PDU session accept message to be provided to the UE from the AMF.

Multiple QoS rules may be included in N1 SM information and N2 SM information of the PDU session establishment accept message.

The SM response message include information to determine which access is used so that a PDU session ID and the AMF are used for a certain UE and the UE.

11) The AMF transmits an N2 PDU session request message to the RAN. The N2 PDU session request message may include N2 SM information and an NAS message. The NAS message may include a PDU session ID and a PDU session establishment accept message.

The AMF may transmit a NAS message including a PDU session ID and a PDU session establishment accept message. Further, the AMF adds the N2 SM information from the SMF to the N2 PDU session request message to transmit N2 PDU session request message the RAN.

12) The RAN may specific signal exchange with the UE associated with information received from the SMF.

Further, the RAN assigns RAN N3 tunnel information with respect the PDU session.

The RAN transfers the NAS message provided during the procedure 10 to the UE. The NAS message may include a PDU session ID and N1 SM information. The N1 SM information may include a PDU session establishment accept message.

When a necessary RAN resource is configured and the RAN tunnel information is successfully assigned, the RAN transmits the NAS message to the UE.

13) The RAN transmits the N2 PDU session response message to the AMF. The N2 PDU session response message may include a PDU session ID, a cause, and N2 SM information.

The N2 SM information may include a PDU session ID, (AN) tunnel information, and an allowed/rejected QoS profile list.

RAN tunnel information may correspond to an access network address of a N3 tunnel corresponding to the PDU session.

14) The AMF may transmit an SM request message to the SMF. The SM request message may include N2 SM information. Here, the AMF may transfer the N2 SM information received from the RAN to the SMF.

15a) When an N4 session with respect to the PDU session is not previous configured, the SMF may start the N4 session establishment procedure together with the UPF. Otherwise, the SMF may start an N4 session modification procedure using the UPF. The SMF may provide AN tunnel information and CN tunnel information. The CN tunnel information may be provided only when the SMF selects the CN tunnel information during a procedure 8.

The UPF may transmit an N4 session establishment/modification response message to the SMF.

16) The SMF may transmit an SM response message to the AMF. If the above procedure is terminated, the AMF may transfer a related event to the SMF. When the RAN tunnel information is changed or upon handover in which the AMF is redisposed, the related event occurs.

17) The SMF transmits information to the UE through a UPF. In detail, in a case of the PDU Type IPv6, the SMF creates an IPv6 Router Advertisement to transmit the IPv6 Router Advertisement through the N4 and the UPF.

18) When the PDU session establishment request is caused due to handover between a 3GPP access and a non-3GPP access, that is, if the request type is set as a "existing PDU session", the SMF release a user plane through a source access (3GPP access or non-3GPP access).

19) When an ID of the SMF is not included during a procedure 4b by an UDM of a DNN subscription context, the SMF may include the SMF address and the DNN to call a "UDM_Register UE serving NF service". The UDM may store an ID and an address of the SMF, and a related DNN.

If the PDU session establishment fails during a procedure, the SMF reports the above to the AMF.

<Registration Procedure Through Untrusted Non-3GPP Access>

The following is a description of a registration procedure to a 5GC network through a untrusted non-3GPP access network by the UE.

Figure 9:
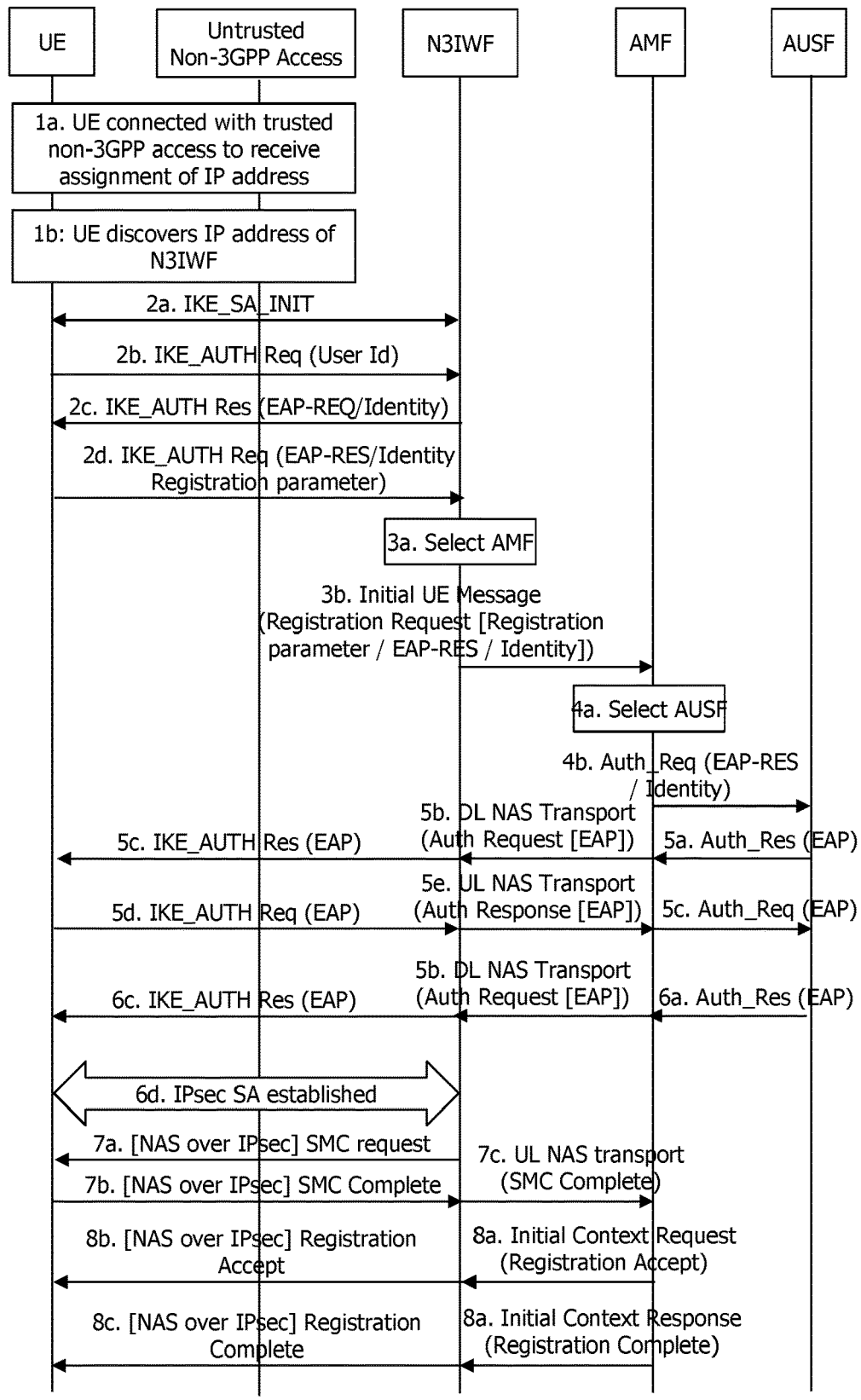
FIG. 9 is a flowchart illustrating a registration procedure through a untrusted non-3GPP access.

FIG. 9 is a flowchart illustrating a registration procedure through a untrusted non-3GPP access.

1) The UE accesses a untrusted non-3GPP access network, and receives assignment of an IP address. During the above procedure, a predetermined non-3GPP authentication method may be used. If the UE is determined to attach to a 5GC network, the UE discovers an IP of an N3IWF from a 5G PLMN.

2) The UE starts an IKEv2 signaling procedure to configure an IPsec SA together with an N3IWF. After a 2a procedure, all subsequent IKEv2 messages are encrypted and integrity thereof is ensured. An N3IWF is operated as an EAP authenticator to search a network access identifier (NAI) of the UE. During the procedure 2d, the UE may transfer a registration type, a permanent user ID, or a 3GPP-unique Vendor Id (VID) payload including a temporary user ID and a registration parameter such as a network slice and an NSSAI. When the UE is previously registered in a PLMN through a 3GPP access and an N3IWF selected during a procedure 1 is not located at the PLMN, the UE may not include a temporary ID thereof in a registration parameter.

3) The N3IWF may select the AMF based on a received registration parameter and a local policy. Next, instead of the UE, the N3IWF may create a registration request message to transmit the registration request message to the AMF through an N2 interface. The registration request message may include a registration parameter and EAP-RES/Identity. The registration request message is encapsulated in an N2 message. The N2 message may include an access type indicating the "trusted non-3GPP access". If a temporary user ID of the UE is included in the registration parameter, the AMF may request an SUPI and MM Context of the UE from another AMF.

4) The AMF may request authentication of the UE to an AUSF by selecting the AUSF to send an Auth_Req message to the AUSF. The Auth_Req message may include EAP-RES/Identity. The AUSF should be operated as an EAP server, and should select an EAP method for authenticating the UE. The EAP method is determined based on UE subscription information and information included in an NAI of the UE. The AUSF may acquire UE subscription information from the UDM.

5) An EAP based mutual authentication procedure is performed between the UE and the AUSF. According to a selected EAP authentication method, a plurality of EAP request/response messages may be transmitted between the UE and the AUSFs. An EAP message may be in encapsulated in an IKEv2 between the UE and the N3IWF. The EAP message is encapsulated in an NAS authentication request/response message between the N3IWF and the AMF, which may be sequentially encapsulated in N2 NAS DL/UL transmission messages. The EAP message may be encapsulated in an Auth_Req/Res message between the AMF and the AUSF.

6a) If the EAP based mutual authentication procedure is successfully completed, the AUSF transmits an Auth_Res message to the AMF. The Auth_Res message may include EAP success, security key. The security key may include an NAS security key and at least one master session key used in an AMF in order to create a security key (N3IWF).

6b) The AMF transmits a DL NAS Transport message to the N3IWF. The DL NAS Transport message may include an EAP success message, a security key of N3IWF and a NAS security mode command (SMC). After the above procedure, the N3IWF may create a UE context storing UE specific information such as UE identity or related N2 connection.

6c-6d) The N3IWF may transmit an IKE_AUTH response message to the UE. Accordingly, configuration of an IPsec SA is completed between the UE and the N3IWF. The IPsec SA (refers to "signaling IPsec SA") may be used to stably transmit the NAS message between the UE and the N3IWF. The NAS message is encapsulated in a GRE through an IPsec. After a procedure 6c, the IKEv2 message may be transmitted to complete configuration of a signaling IPsec SA.

7) The N3IWF may transmit an NAS SMC request received from the AMF during a procedure 6b through the configured IPsec SA to the UE. The UE transmits an NAS SMC complete message. The NAS SMC complete message may be included in an N2 UL NAS transmission message to be transferred to the AMF.

8. The AMF adds an NAS registration approval message in an N2 initial context configuration request message to transmit the N2 initial context configuration request message to the N3IWF. The N2 initial context configuration request may be transferred to the UE through the IPsec SA. Finally, the UE adds the NAS registration complete message forwarded to the AMF by the N3IWF to an N2 initial context configuration response message to transmit the N2 initial context configuration response message.

<PDU Session Establishment Procedure of UE Through Trusted Non-3GPP Access>

The following is a description of a procedure of establishing a PDU session through a non-3GPP access network which is not trusted.

Figure 10:
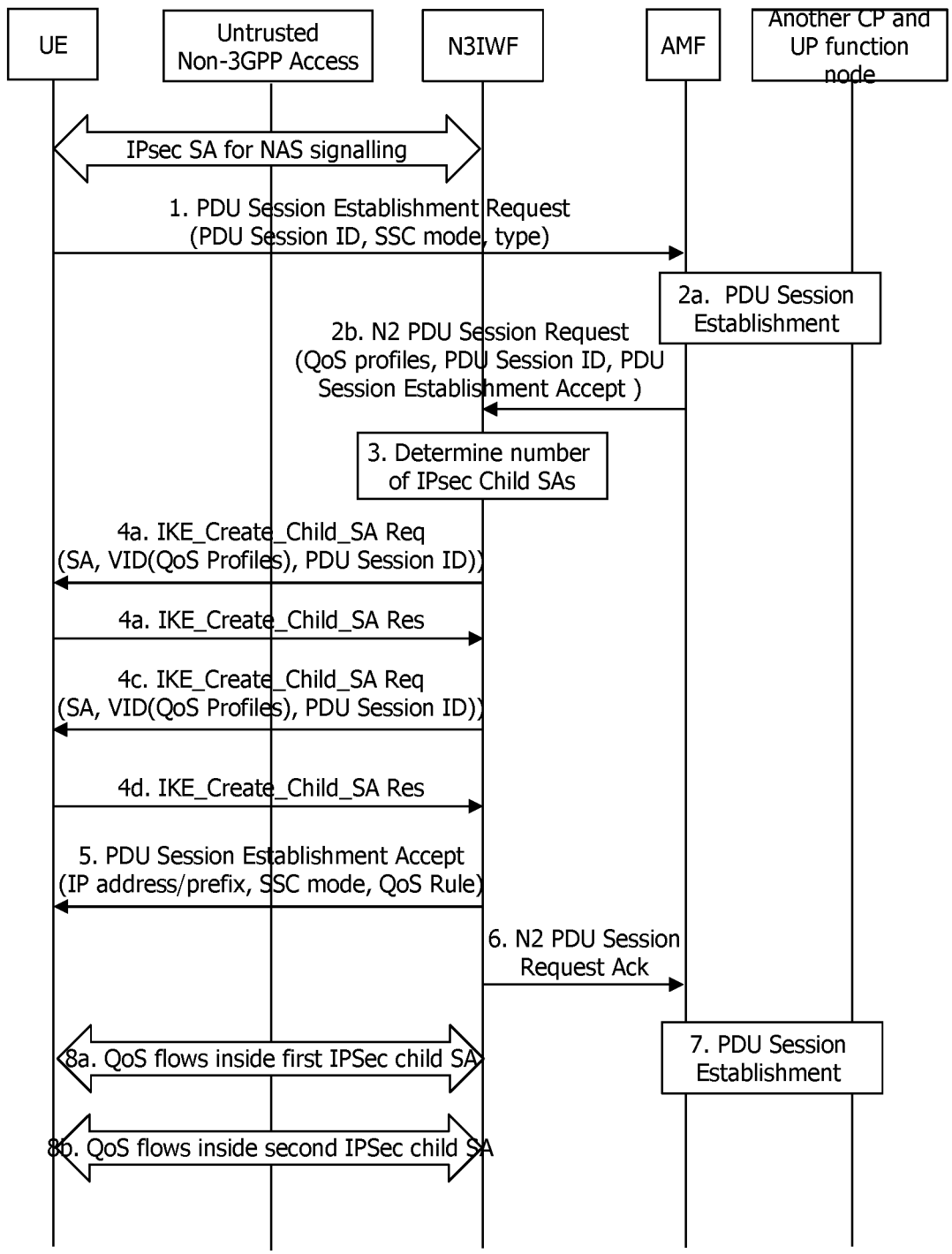
FIG. 10 is a flowchart illustrating a PDU session procedure of UE through a untrusted non-3GPP access.

FIG. 10 is a flowchart illustrating a PDU session procedure of UE through a trusted non-3GPP access.

First, it is assumed that the UE performs a registration procedure in a 5GC network through a non-3GPP access network which is not trusted.

1) The UE transmit a PDU session establishment request message to the AMF. As described above with reference to FIG. 8, the PDU session establishment request message may include an ID of a PDU session, a request type, an SSC mode, and a protocol configuration option. The PDU session establishment request message may be transmitted to the N3IWF through an IPsec SA configured for the NAS signal. The N3IWF transfers the PDU session establishment request message to an AMF of a 5GC network.

2a) A PDU session establishment procedure is performed through a 3GPP access.

2b) The AMF transmits an N2 PDU session establishment request message in order to configure an access resource with respect to a PDU session to the N3IWF. As described above with reference to FIG. 8, the PDU session establishment request message may include an ID of the PDU, a request type, an SSC mode, and a protocol configuration option. Moreover, the PDU session establishment request message may include a QoS profile of a previously allowed QoS rule of a requested PDU. In a case of a Q-type QoS rule, a N2 PDU session request message includes a QoS parameter with respect to the QoS profile. In addition, the N2 PDU session request message includes a PDU session accept activation message to be forwarded to the UE.

3) Based on the QoS profile received at a previous step and a policy and a configuration, the N3IWF determines the number of IPsec child SAs to be established and a QoS profile associated with an IPsec child SA. For example, the N3IWF configures the IPsec child SA to associated all QoS profiles with the IPsec child SA. In this case, all QoS flows of the PDU session may be transmitted through one IPsec child SA.

4a) The N3IWF transmits an IKE CREATE_CHILD_SA request message to the UE in order to establish a first IPsec child SA. The IKE CREATE_CHILD_SA request message may include a 3GPP-unique VID payload. The VID payload may include a QoS profile associated with a child SA, an ID of a PDU session associated with the child SA, and a DSCP value associated with a child SA. An IKE Create_Child_SA request message may include information such as Traffic Selector (TS) for an SA payload N3IWF and the UE.

4b) If the UE accepts a new IPsec child SA, the UE transmit an IKE Create_Child_SA response message. While establishing the IPsec child SA, an IP address may not assigned to the UE yet.

4c-4d) During a procedure 3, when the N3IWF determines to establish a plurality of IPsec child SAs with respect to the PDU session. The additional IPsec child SAs may be connected with at least one QoS profile.

5) If all IPsec child SAs are established, a PDU session establishment accept message received by step 2b to the UE through an IPsec SA for signaling NAS.

6) The N3IWF transmits an N2 PDU session request acknowledge (Ack) to the AMF.

7) APDU session establishment procedure is performed through a 3GPP access.

8) In a user plane,

When the UE transmits a UL PDU, the UE determines a QoS profiler associated with the UL PDU (using a QoS rule of a session in a PDU). Furthermore, the UE may encapsulate the UL PDU in a GRE packet to transmit the GRE packet to the N3IWF through the IPsec child SA associated with the QoS profile. A header of the GRE packet is transmitted to a QoS profile associated with the UL PDU.

If the N3IWF receives a DL PDU through an N3, the N3IWF uses QoS marking and an identifier of the PDU session in order to determine the IPSec child SA. The N3IWK encapsulates the DL PDU in the GRE packet to copy the QoS marking to a header of the GRE packet. Accordingly, the N3IWF may add a Reflective QoS Indicator (RIFI) to be used by the UE to the GRE header.

<PDU Session Handover Procedure Between 3GPP Access and Trusted Non-3GP P Access>

Figure 11A:
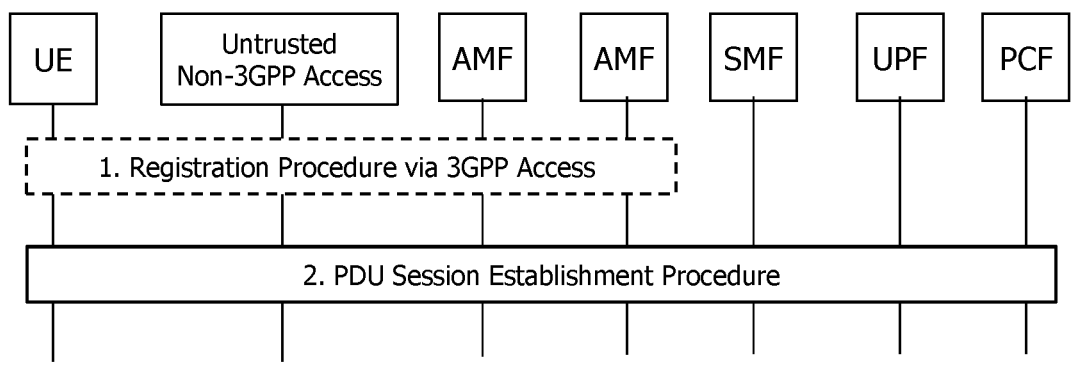
FIG. 11a illustrates a PDU session handover procedure to a 3GPP access from a untrusted non-3GPP access.

FIG. 11a illustrates a PDU session handover procedure to a 3GPP access from a trusted non-3GPP access.

Referring to FIG. 11a, when the UE is not registered in a 3GPP access, the UE performs a registration procedure.

Further, the UE performs a PDU session establishment procedure.

FIG. 1b illustrates a PDU session handover procedure to a trusted non-3GPP access from a 3GPP access.

Figure 11B:
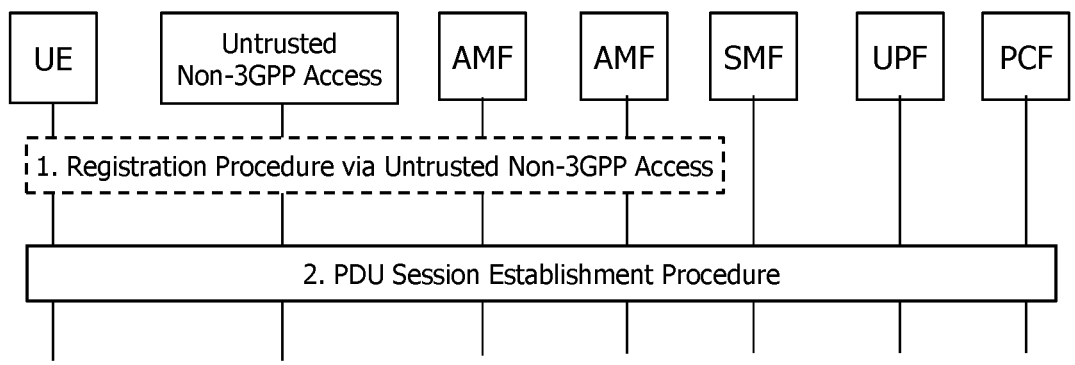
FIG. 11b illustrates a PDU session handover procedure to a untrusted non-3GPP access from a 3GPP access.

Referring to FIG. 11b, when the UE is not registered in a trusted non-3GPP access, the UE performs a registration procedure.

In addition, the UE perform a PDU session establishment procedure.

<Discloses of the Present Specification>

In a roaming situation, if the UE transmits a PDU session establishment request message to a network to receive a response thereto, it may be known that a PDU session is established. However, the UE cannot know whether a PDU session is established in a Local Breakout (LBO) scheme or a Home Routed (HR) scheme. In order to perform handover between 3GPP and non-3GPP, the same SMF is basically selected in UEs so that the same UPF/IP address may be assigned. After the UE establishes the PDU session in an LBO scheme through a 3GPP access in a roaming situation, the UE should create a PDU session in an LBO scheme at a non-3GPP access to handover to the non-3GPP. However, when the handover is not considered and the PDU session is created, a problem may occur. For example, an N3IWF for a non-3GPP access is selected, the UE may select an N3IWF in an HPLMN instead of an N3IWF in a VPLMN providing a service to the UE. In this case, a PDU session is created in a LBO scheme in the 3GPP access and the PDU session is created in a non-roaming scheme in a non-3GPP access so that handover may not be performed. However, since the UE cannot know whether or not real handover is successfully performed so that the handover may be attempted. In this case, unnecessary signaling occurs.

Accordingly, the disclosure of the present specification provides methods for solving the above problems.

I. First Disclosure: Method of Reporting Whether a Corresponding PDU Session is Established in an LBO Scheme or an HR Scheme while Establishing the PDU Session Now, the UE cannot know whether a corresponding PDU session is created in an LBO scheme or an HR scheme when creating the PDU session. The first disclosure suggests that a network node (e.g., SMF) include information indicating which scheme a PDU session is created in a PDU Session Establishment Accept message. When the UE performs registration through 3GPP access/non-3GPP access, the UE knows in which PLMN the UE is registered, if the UE knows PLMN information and a scheme (that is, LBO scheme or HR scheme) used to establish the PDU session, the UE may determine whether handover (HO) is possible.

a) First, when the UE is registered through a 3GPP access,
The UE performs N3IWF selection before registering in a non-3GPP access. If it is determined that an N3IWF selected by the selection procedure is located at the same PLMN as that of the 3GPP access, and the registration is successfully completed, the UE may determine that the PDU session can handover regardless of whether a scheme used to establish the PDU session is an LBO scheme or an HO scheme.

However, if it is determined that the N3IWF selected by the selection procedure is located at a PLMN different from a 3GPP and the registration is successfully completed, only when a PDU session of the 3GPP access is established in an HR scheme, the UE may determine that the PDU session can handover.

b) When the UE is firstly registered through an non-3GPP access,
when the UE knows during registering in a 3GPP access that the UE is successfully registered in the same PLMN as a PLMN in which the N3IWF for non-3GPP access is located, the UE may determine that the PDU session can handover regardless of whether a scheme used to establish the PDU session is an LBO scheme or an HO scheme.

When the UE knows during registering in a 3GPP access that the UE is successfully registered in a PLMN different from a PLMN in which the N3IWF for non- 3GPP access is located, only when a PDU session through an non-3GPP access is established in an HR scheme, the UE may determine that the PDU session can handover.

Meanwhile, an SMF may transmit information or indicator (e.g., HO indication) indicating which handover is possible instead of directly reporting whether the scheme is an HO scheme or a LBO scheme. For example, the SMF may transmit HO indication indicating that handover is possible with respect to PDU sessions created through handover.

If the UE receives indication indicating that the handover is possible, the UE may perform handover whether a PDU session through a 3GPP session and a PDU session through a non-3GPP access are established in the same PLMN or in different PLMNs. If the information (or indicator) is not received, only when the PDU session through a 3GPP session and the PDU session through a non-3GPP access are established in the same PLMN, the UE may perform the handover.

Figure 12:
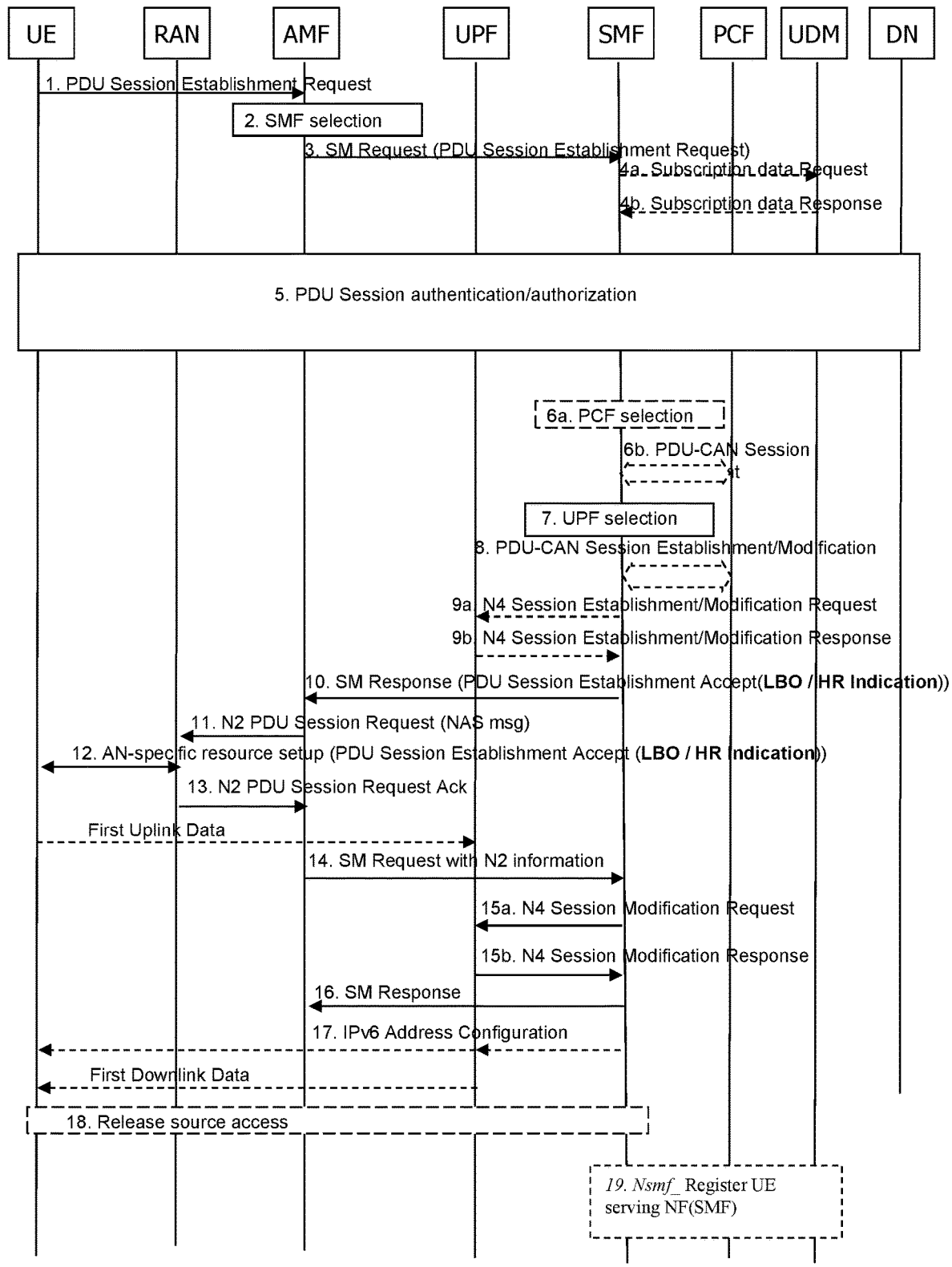
FIG. 12 is a flowchart illustrating a method of indicating whether a PDU session is established in a LBO scheme or an HR scheme according to a first disclosure of the present specification.

FIG. 12 is a flowchart illustrating a method of indicating whether a PDU session is established in a LBO scheme or an HR scheme according to a first disclosure of the present specification.

Referring to FIG. 12, the UE transmits a PDU session establishment request message to the AMF. Referring to FIG. 8 and FIG. 10, the PDU session establishment request message may include an ID of the PDU, a request type, an SSC mode, and a protocol configuration option.

During a procedure 10, the SMF may include and transmit information or an indication indicating whether the PDU session is established in an HR scheme or an LBO scheme while transmitting a PDU session accept message. Further, the SMF may include and transmit an indication (e.g., HO Indication) indicating whether handover is possible. Although an example of FIG. 12 illustrates a procedure in 3GPP access, the above is similarly applicable to the non-3GPP access.

II. Second Disclosure: Method of Reporting Whether to Handover the PDU Session to the UE According to the first disclosure described as above, the network should report whether the PDU session is established in a LBO scheme or an HR scheme to the UE. However, since the first disclosure provides topology information of a network, the first disclosure may be a scheme to which businessmen do not prefer. The second disclosure suggests to report only information on which handover is possible to the UE instead of not providing the same information of the first disclosure to the UE.

To this end, the UE may transfer an indication indicating that registration is performed for handover between a 3GPP access and a non-3GPP access when performing registration in another access for handover. Further, the UE may transfer the indication together with an ID of a PDU session to handover. The UE may report which PDU session handovers by transferring an ID of the PDU session.

Accordingly, when the UE performs a registration procedure between a 3GPP access and a non-3GPP access, the AMF acquires PDU session information from the UDM based on a PDU session ID received from the UE. Further, the AMF knows a PDU session ID to handover based on PDU session information acquired from the UDM. When PDU session information mapped to the PDU session ID is discovered, the AMF determines whether to handover the PDU session based on context information. To this end, when the PDU session is created, the SMF may store information on whether a corresponding PDU session is established in an HR scheme or an LBO scheme in the UDM. That is, when SMF information and PDU information are stored during a procedure 19 of FIG. 12, the SMF may store information on whether a corresponding PDU session is established in the HR scheme or the LBO scheme.

Meanwhile, as described above, the AMF may store an ID of the PDU and an ID of the SMF in connection with each other. Accordingly, when the ID of the PDU session received from the UE indicates a previous PDU session, the AMF may discover an ID of the SMF stored in connection with the ID of the PDU session. Here, the ID of the SMF includes a PLMN ID. Accordingly, the AMF may know the AMF and the SMF are included in the same PLMN or different PLMNs based on a PLMN ID extracted from the ID of the SMF. If the AMF and the SMF are located at the same PLMN in a state that a roaming UE in 3GPP access handover-requests the 3GPP access PDU session to a non-3GPP while being connected with the HPLMN at the non-3GPP access, the UE may determine that a corresponding PDU session is established in the HR scheme. In this case, the AMF may determine that handover is possible. Furthermore, if the AMF and the SMF are located at the HPLMN, the AMF may determine that a corresponding PDU session is established in the HR scheme. On the other hand, when it is determined that the AMF and the SMF are located at different PLMNs, the AMF may determine that a corresponding PDU session is established in the LBO scheme. In this case, the AMF may determine that the handover is impossible.

Meanwhile, when the AMF knows that there is a PDU session mapped to a PDU session ID received from the UE, the AMF may select the SMF being responsible for a corresponding PDU session. When the AMF can transfer SM signaling to the SMF, the AMF may determine that a corresponding PDU session may handover. If there is a context with respect to the PDU session, since the AMF cannot transfer SM signaling to the SMF when the SMF is located at a different PLMN, the AMF may determine that it is impossible to handover a corresponding PDU session.

Figure 5A:
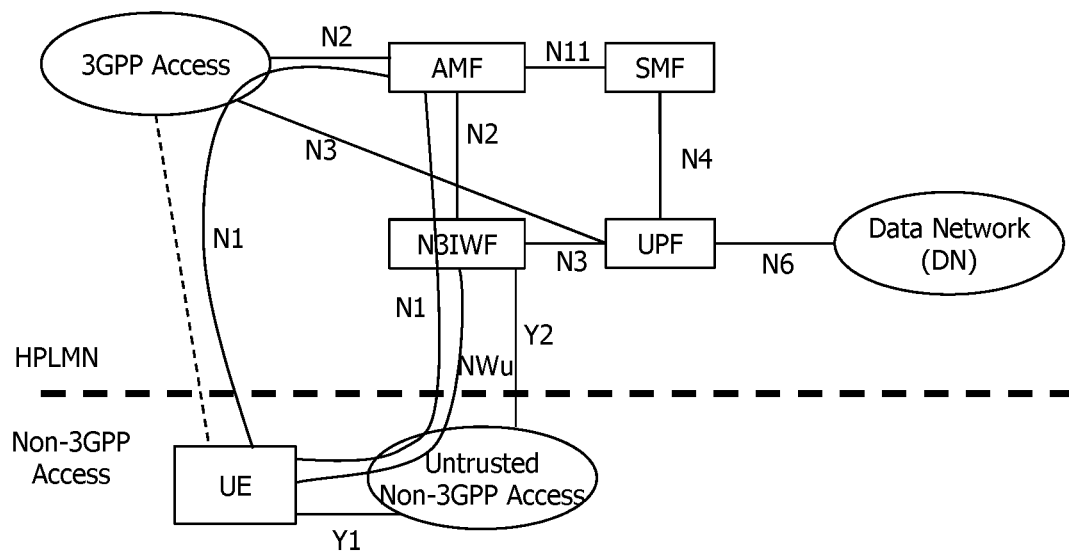
FIG. 5a to FIG. 5f illustrate architectures for bypassing data to the non-3GPP network.
Figure 5B:
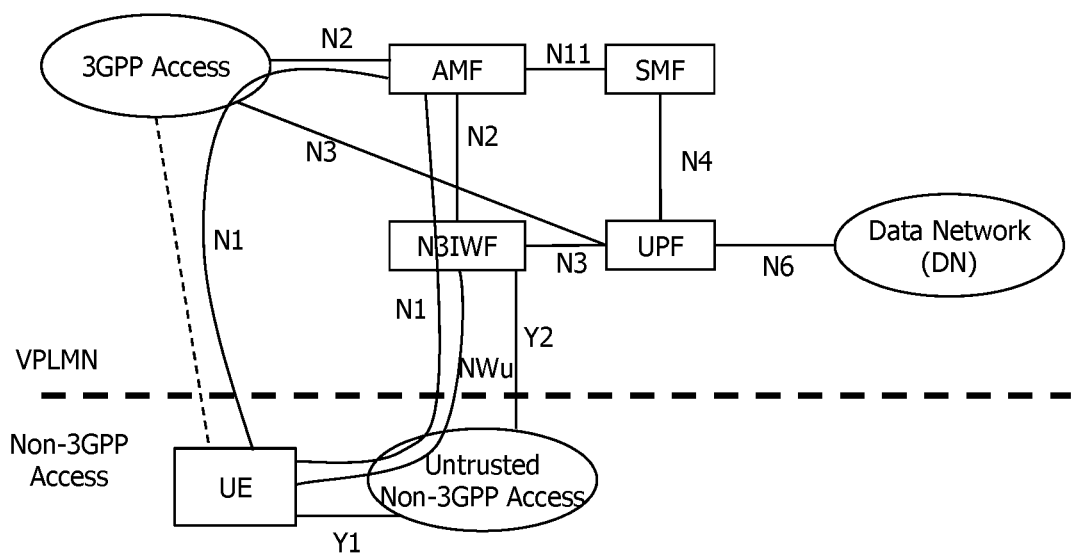
Figure 5C:
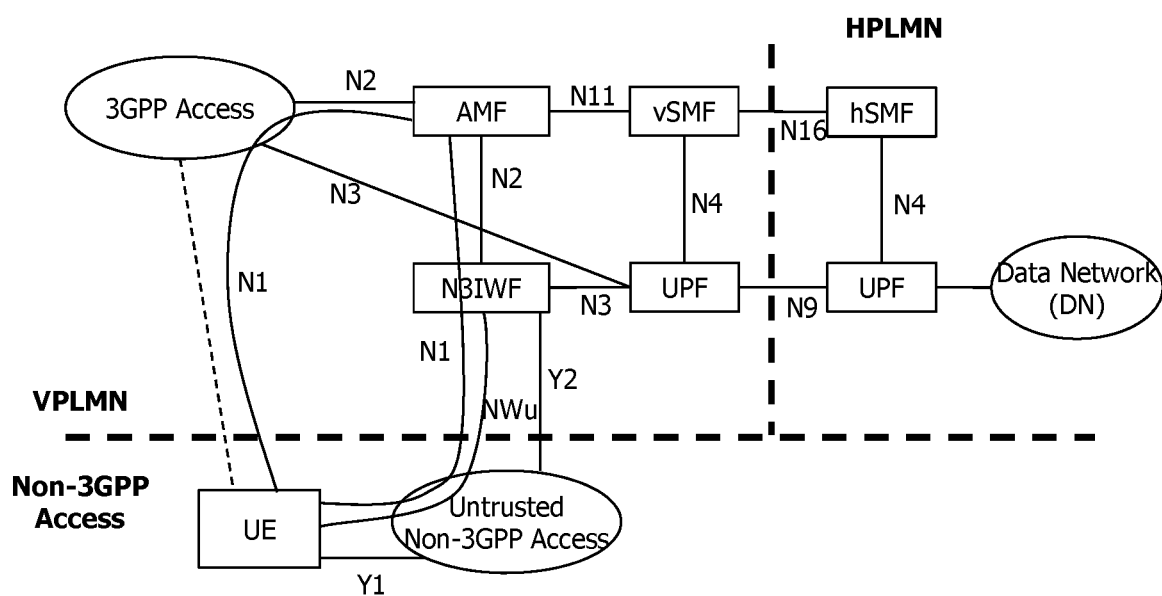
Figure 5D:
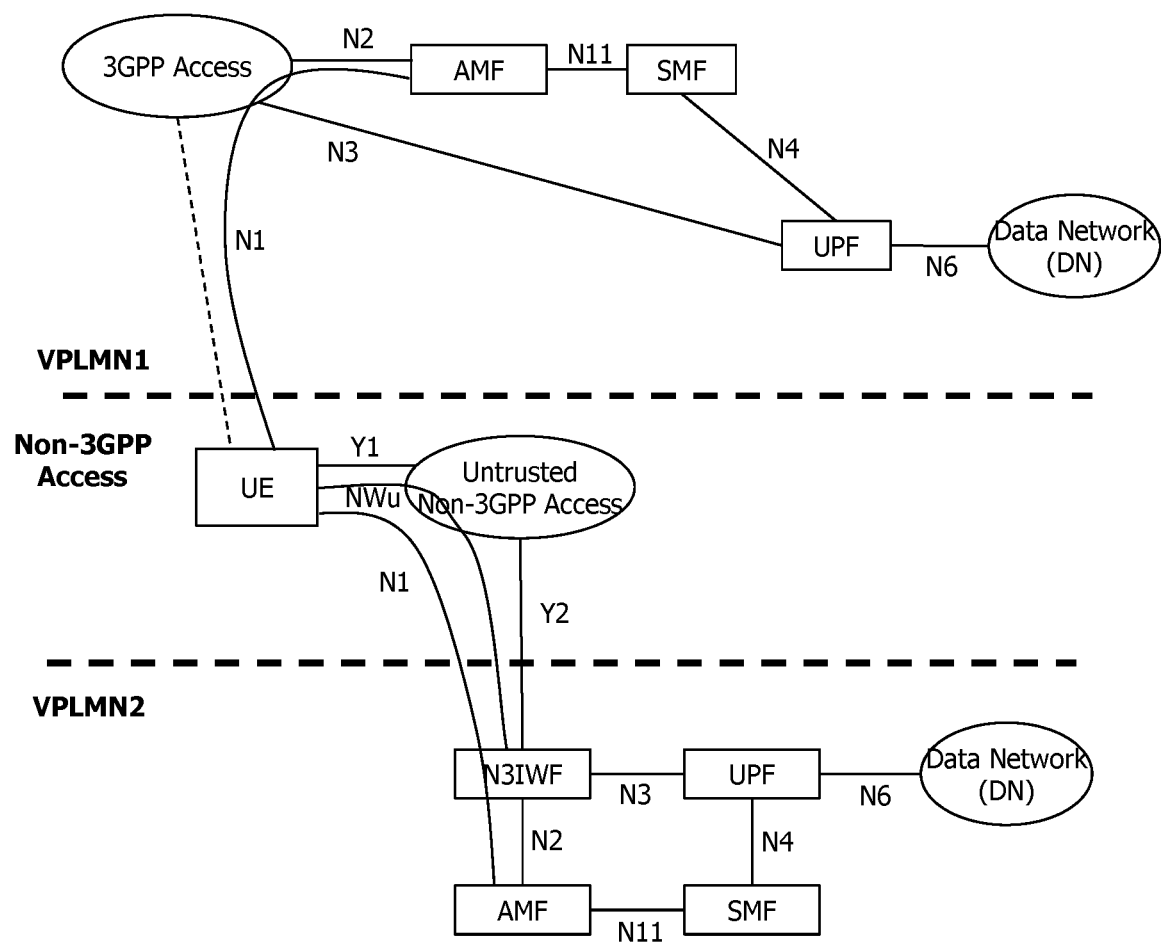
Figure 5E:
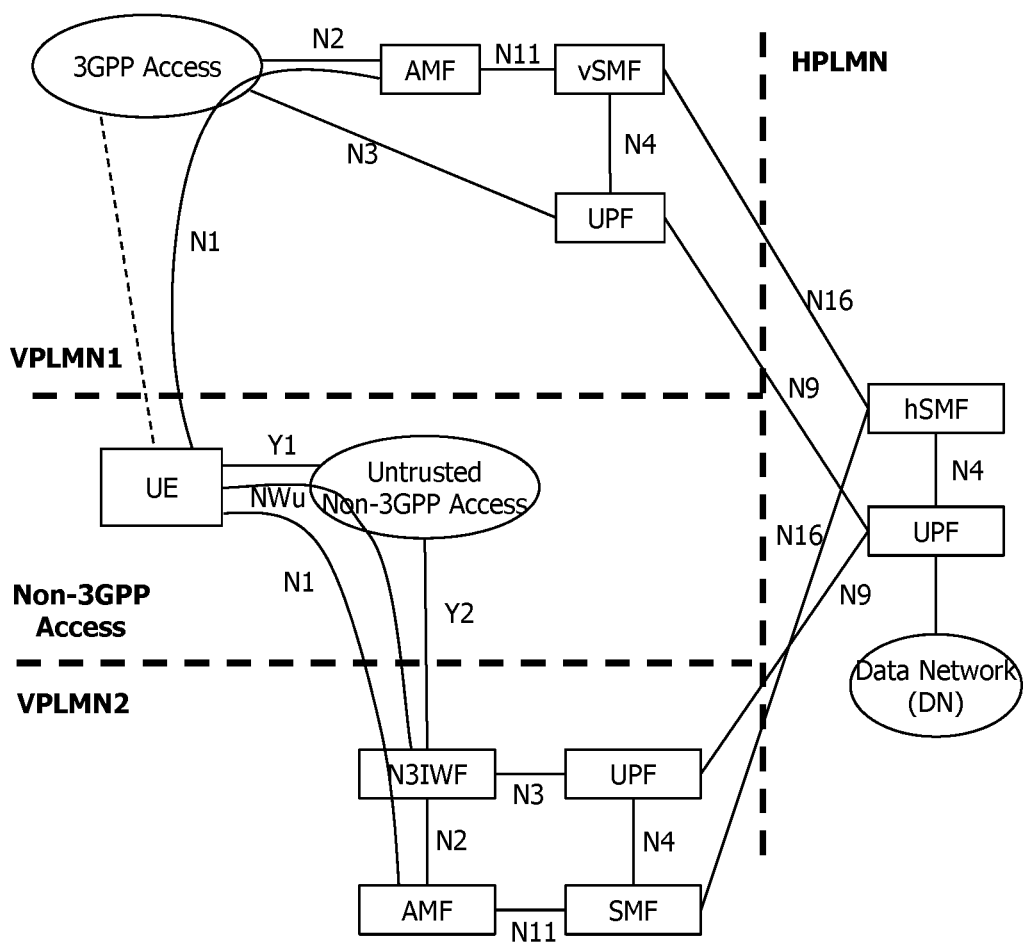
Figure 5F:
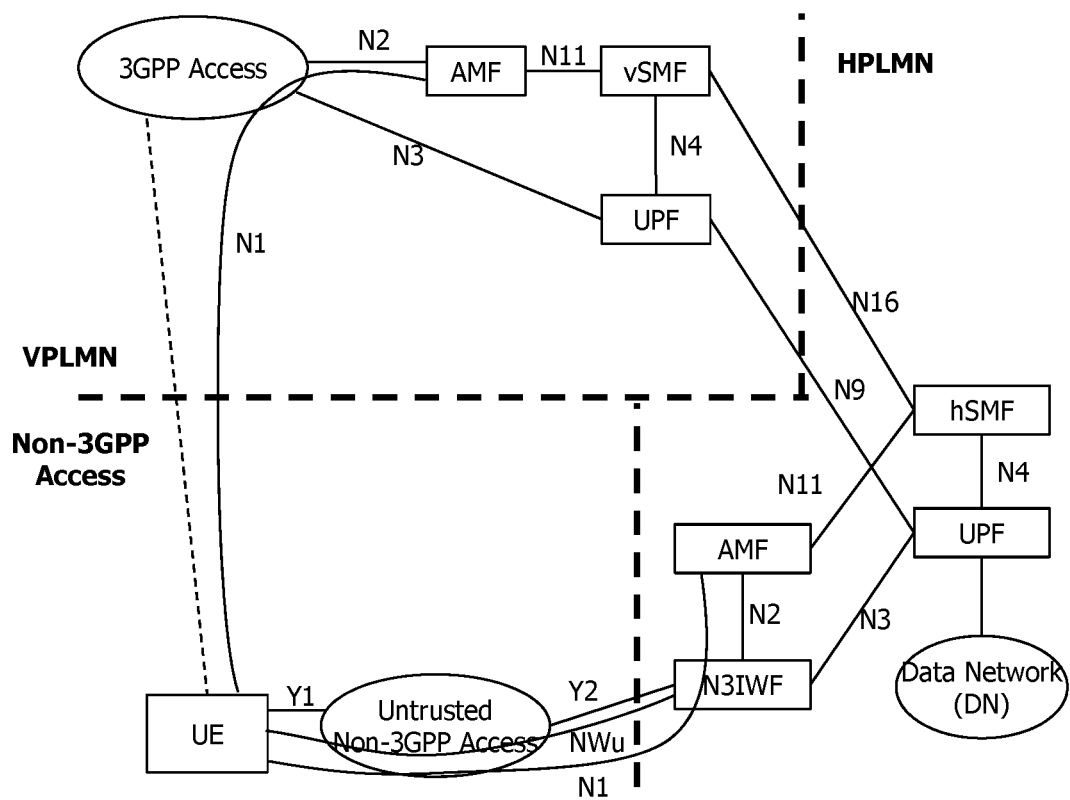
Figure 6A:
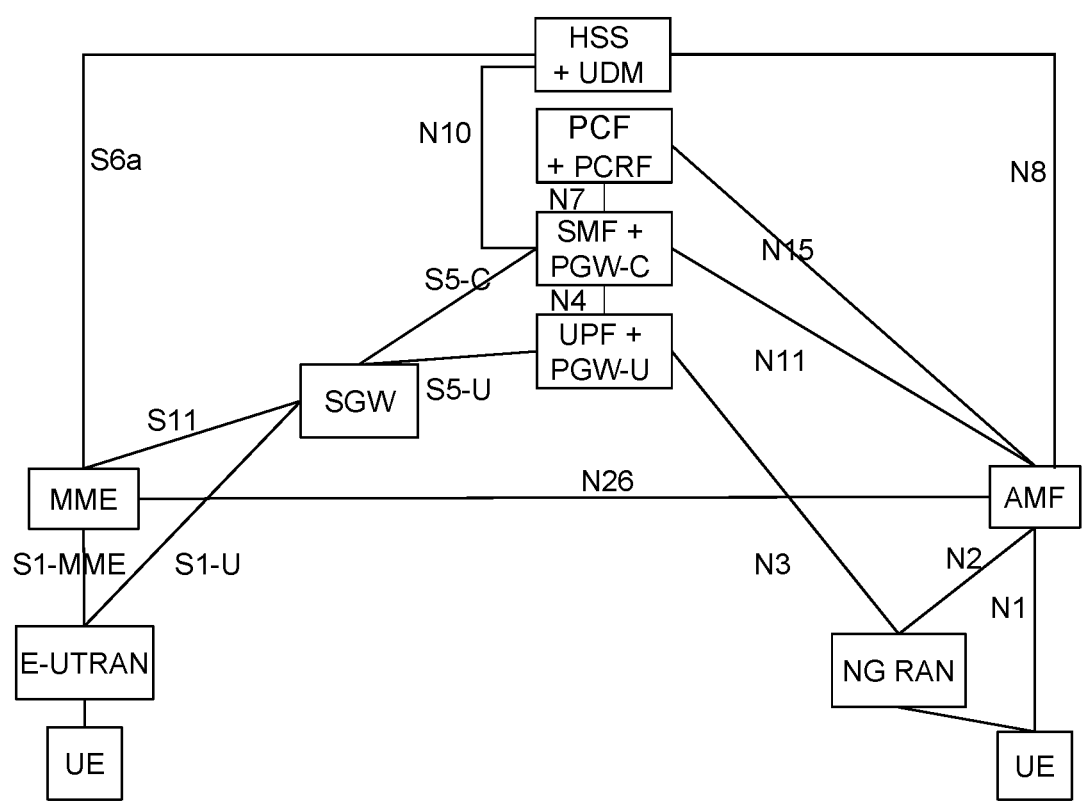
FIG. 6a illustrates an architecture for interworking when the UE does not roam.
Figure 6B:
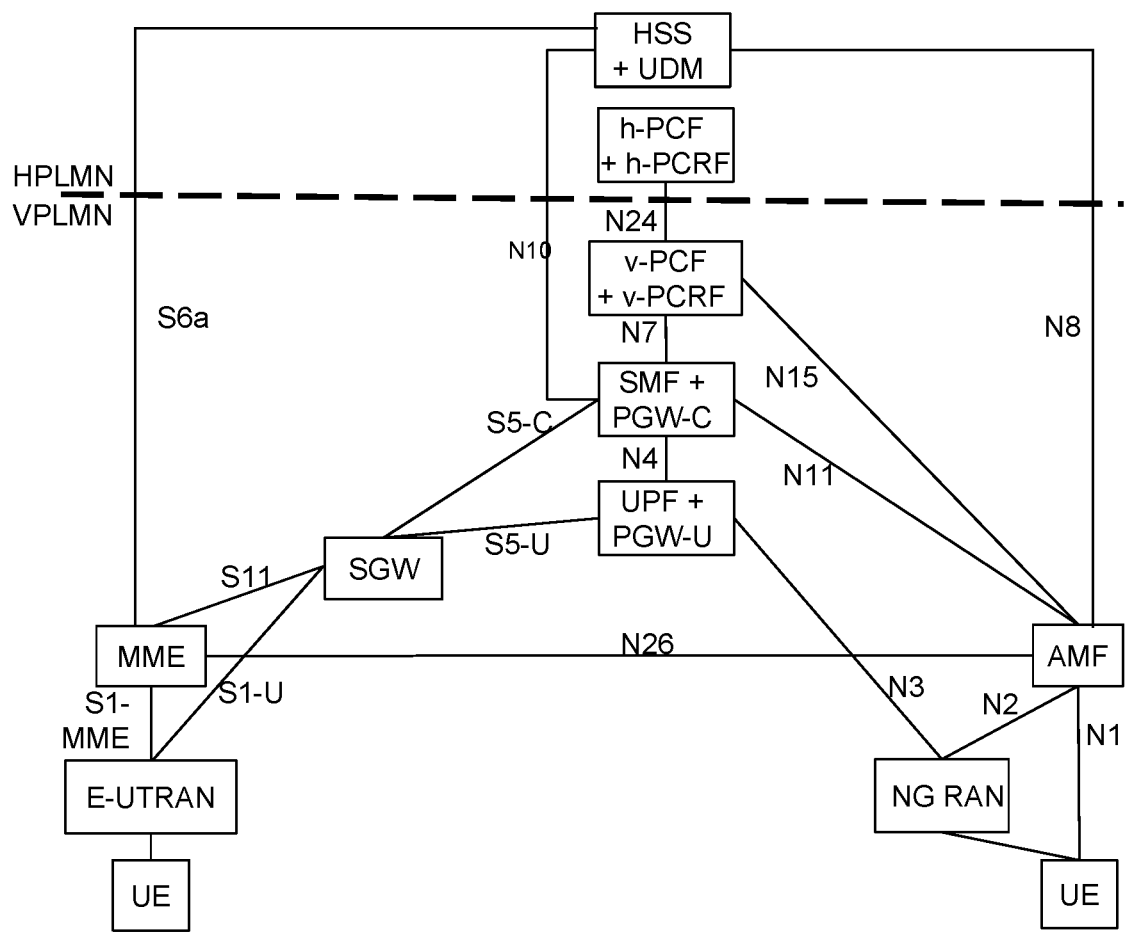
FIG. 6b illustrates an architecture for interworking when the UE roams.

As shown in FIG. 5e, if both of the 3GPP access and the non-3GPP access are connected with a PLMN different from the HPLMN, it may not determine whether the a corresponding PDU session is established in the HR scheme or the LBO scheme based on only PLMN information. In this case, the above determination may be performed based on PDU session information stored in a UDM. When the AMF knows an HPLMN of the UE and an ID of the SMF includes a PLMN ID, the AMF may compare an HPLMN ID of the UE with PLMN ID extracted from an ID of the SMF to determine whether or not a PDU session is established in the HR scheme.

Although the UE does not report registration for handover, when the UE performs initial registration or mobility registration, the AMF may report whether handover is possible by DNNs and/or S-NSSAIs while transferring a registration accept message to the UE.

That is, the AMF may report that the handover is possible between the 3GPP access and a non-3GPP access while transmitting the registration accept message. The UE may be operated as follows based on whether the handover is possible.

When the handover is possible, the UE performs the handover procedure.

When the handover is impossible, the UE may determine whether to perform an additional operation based on an SSC mode of the PDU session.

For example, when a PDU session to be moved corresponds to a SSC mode 2 based PDU session, the UE stops an existing PDU session to create a new PDU session through a newly accessed access network.

If a PDU session to be moved corresponds to a SSC mode 3 based PDU session, the UE may request a new PDU session while maintaining an existing PDU session through a newly accessed access network. An application layer of the UE may move traffic to a newly created PDU session by maintaining two sessions for a while. If a predetermined time elapses or all traffics are moved to a new PDU session, the UE stops an existing PDU session.

If a PDU session to be moved corresponds to a SSC mode 1 based PDU session, the UE may perform an operation such as an SSC mode 3 or stop the handover.

The AMF may not allow the registration and may transmit a registration rejection message. In this case, a cause field of the registration rejection message may include a cause value indicating that a HO is impossible to be rejected.

Figure 13:
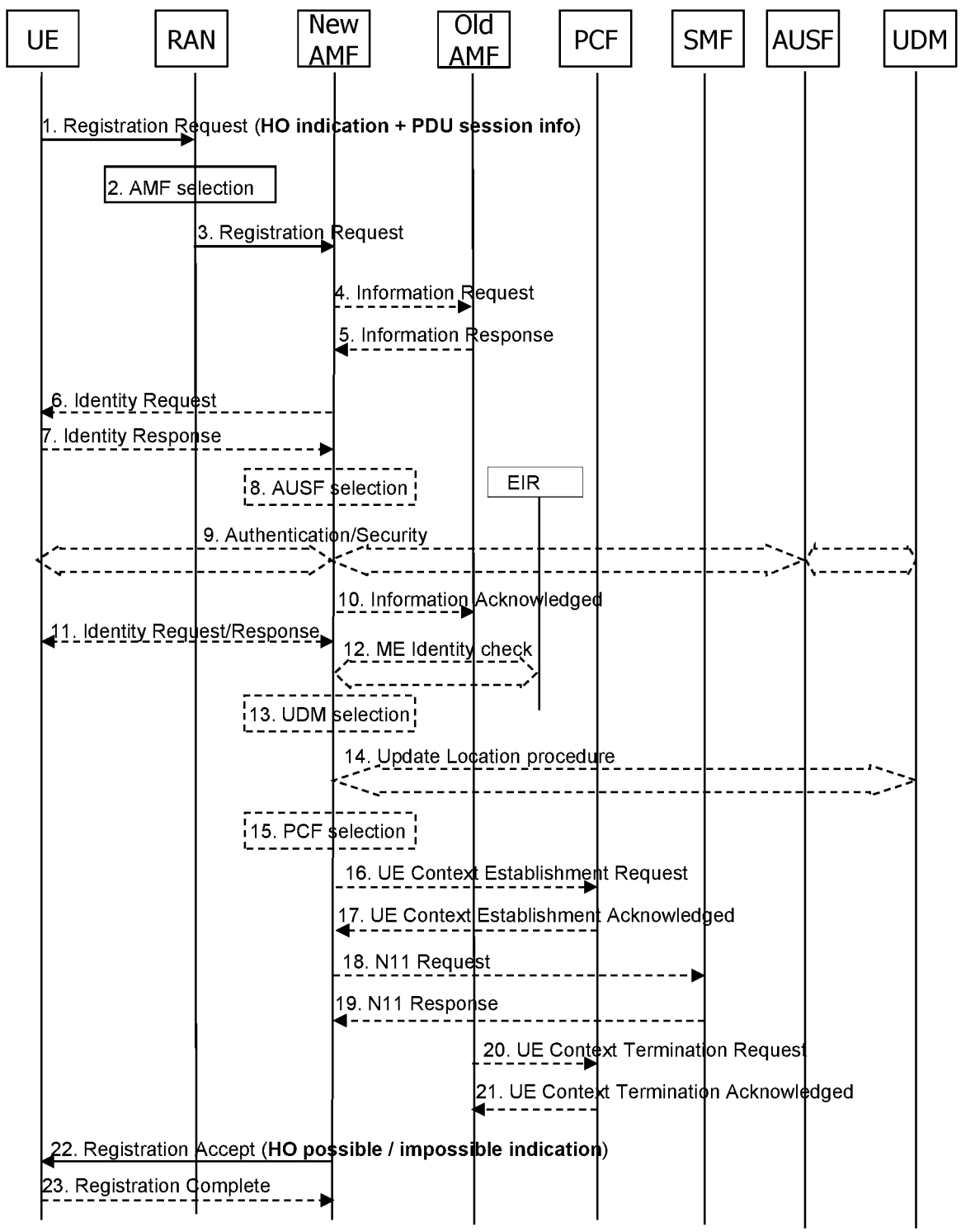
FIG. 13 is a flowchart illustrating a method of indicating whether handover to the UE is possible during a registration procedure according to a second disclosure of the present specification.

FIG. 13 is a flowchart illustrating a method of indicating whether handover to the UE is possible during a registration procedure according to a second disclosure of the present specification.

As shown in FIG. 1 in a procedure 1 of FIG. 13, when the UE performs a registration procedure in a new access for handover, the UE adds information of a handover indication and a PDU session to handover (e.g., PDU session ID) to a registration request message to send the registration request message. Accordingly, as illustrated in a procedure 22, the AMF transmits a registration accept message including information indicating whether the handover is possible using the above scheme. Although the above example indicates a procedure of 3GPP access, the above content is equally applicable to a non-3GPP.

III. Third Disclosure: A Method of Controlling an Operation of UE by Transmitting a Rejection Message Including a Rejection Cause Value With Respect to a PDU Session Establishment Request of UE for Handover.

According to the second disclosure, if the network reports information on whether handover is possible, the UE directly determines based on the information to perform an operation of newly creating a PDU session. However, in this case, the network cannot control the UE in a desired direction. Accordingly, a third disclosure of the present specification is suggested as described below. In detail, if the UE transmit a PDU session establishment request message for handover after performing a registration procedure, the third disclosure determines whether the AMF can perform handover. If it is determined that the handover is impossible, the AMF transmits a rejection message including a rejection cause value. A method of determining whether the handover is possible is the same as that described in the second disclosure. If a rejection cause value is re-establish required, the UE may recognize that the handover fails to request establishment of a new PDU session through a new approaching access network. If the rejection cause value indicates that the handover is impossible such as "handover not supported", the UE stops the handover. The rejection cause value is determined based a policy or a DNN configured by a businessman. For example, when an IMS DNN is used, the rejection cause value is re-establish required so that the UE may continuously receive the service. However, when an IoT DNN is used, the rejection cause value indicates 'handover not supported' so that the UE may not perform the handover.

However, when an IoT DNN is used, the rejection cause value indicates 'handover not supported' so that the UE may not perform the handover.

Figure 14:
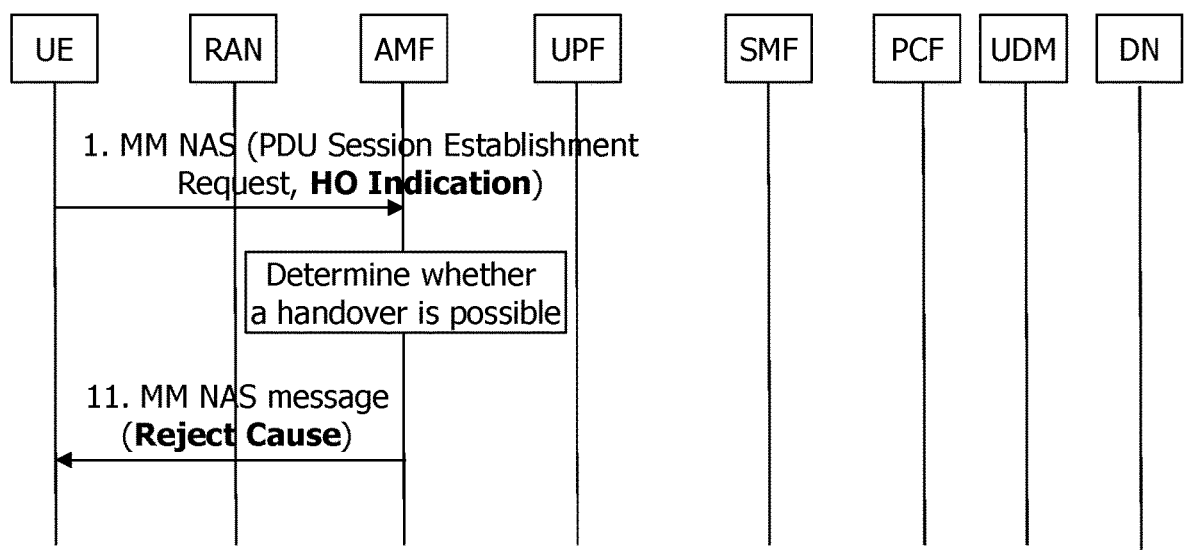
FIG. 14 is a flowchart illustrating a method of controlling an operation of the UE by transmitting a message including a rejection cause value with respect to a PDU session establishment request for handover according to a third disclosure of the present specification.

FIG. 14 is a flowchart illustrating a method of controlling an operation of the UE by transmitting a message including a rejection cause value with respect to a PDU session establishment request for handover according to a third disclosure of the present specification.

Referring to FIG. 14, the UE transmits a PDU session establishment request message to the AMF. As described above with reference to FIG. 8, FIG. 10, and FIG. 12, the PDU session establishment message may include an ID of a PDU, a request type, an SSC mode, and a protocol configuration option.

If the UE transmits a PDU session establishment request message, the AMF determines whether the handover is possible. In detail, as described above in the second disclosure, the AMF indicates that the request type in the received PDU session establishment request message is an "existing PDU session". When a PDU session ID in the received PDU session establishment request message indicates an ID of an existing PDU session, the UE may determine whether the handover is possible.

In detail, as described above, the AMF may store the PDU session ID and the ID of the SMF in connection with each other. Accordingly, when a PDU session ID in the PDU session establishment request message received from the UE, the AMF may discover an ID of the SMF stored associated with the PDU session ID. Here, the ID of the SMF includes a PLMN ID. Accordingly, the AMF may know whether the AMF and the SMF are located at the same PLMN or different PLMNs based on a PLMN ID extracted from the ID of the SMF. If the AMF and the SMF are located at the same PLMN, the AMF may determine that a corresponding PDU session is established in the HR scheme. In this case, the AMF may determine that the handover is possible. Further, if both of the AMF and the SMF are located at the HPLMN, the AMF may determine that a corresponding PDU session is established in the HR scheme. Conversely, when the AMF and the SMF are located at different HPLMNs, the AMF may determine that a corresponding PDU session is established in the LBO scheme.

Meanwhile, when a PDU session ID in the PDU session establishment request message received from the UE indicates an existing PDU session, the AMF may select an SMF being responsible for a corresponding PDU session. When SM signaling may be transferred to the SMF, the AMF may determine to handover a corresponding PDU session. If there is a context with respect to the PDU session, since the AMF cannot transfer the SM signaling to the SMF when the SMF is located at a different PLMN, the AMF may determine that handover of the corresponding PDU session is impossible.

Meanwhile, when the AMF does not know an existing PDU session indicated by a PDU session ID in the PDU session establishment request message received from the UE, the AMF may acquire information on the PDU session from the UDM. Moreover, the AMF may determine whether to handover the PDU session based on PDU session information acquired from the UDM.

When it is determined that the handover is impossible, the AMF may include a rejection cause value in an MM NAS message to transmit the MM NAS message. The UE may determine a subsequent operation according to the rejection cause value.

In detail, the UE may perform a following operation according to a rejection cause value sent from the AMF.

(a) When the rejection cause value indicates 'handover not supported', 'HO is not allowed' or 'payload was not forwarded', the UE does not request the handover with respect to a corresponding PDU session longer. Moreover, the UE may perform a following operation (until the PDU session stops, a PDU session is registration-released in a created PLMN, or an N3IWK is changed to a node included in another PLMN).

If a PDU session is in a SSC mode 1 or a SSC mode 3, the UE additionally creates a PDU session having the same DNN/N-SSAI/SSC mode/PDU type as those of the PDU session to handover through another access. The UE may wait until an application layer of a next UE moves a traffic included in a PDU session to handover to another access to release a previous PDU session while remaining a new PDU session.

If the PDU session is an SSC mode 2, the UE may firstly stop the PDU session to handover and establish a new PDU session through another access to request the service.

The UE may send an indication to request that the PDU session is established while requesting a new PDU session regardless of an operation according to an SSC mode. In this case, an LBO is allowed in subscriber information of the UE according to a polity or setting of the businessman, the AMF may select a V-SMF and an H-SMF to create the PDU session in an HR scheme. In this case, while the AMF selectively transmits a PDU session establishment request message to V-SMF/H-SMF, the UE may include indication indicating that the HR scheme is requested. When the H-SMF receives the indication, information indicating that the PDU session is created in a HR scheme may be included in the PDU session establishment accept message. In a case of a PDU session created by the above method, although the UE receives a message including a rejection cause value indicating 'HO is not allowed indication' with respect to a PDU session having the same DNN/S-NSSAI form the AMF, the UE may again request handover. However, when the UE again receives a message including a rejection cause value indicating 'HO is not allowed indication' with respect to a PDU session from the AMF even if the UE transmits an indication to request to establish the PDU session in an HR scheme, the UE should not again request handover with respect to a PDU session having a corresponding DNN/S-NSSAI.

(b) When a rejection cause value indicates congestion.

When a rejection cause value in a message transmitted from the AMF indicates congestion, the message may include a back-off time value together. The UE drives a back-off timer based on the back-off time value of a rejection message received from the AMF. Since this case is rejected due to congestion, the UE may not again attempt a request until a back-off timer is expired. That is, until the back-off timer is expired, the UE does not again request the handover. Alternatively, if the AMF indicates that the rejection cause value is congestion but the UE knows that HO is not allowed through another indication, the UE may not again request handover even if the back-off timer is expired. A next operation may be the same as that when a rejection cause value indicates that 'HO is not allowed indication'.

Alternatively, although the rejection cause value indicates congestion, similar to a case where the rejection cause value indicates 'HO is not allowed', the UE may be operated.

IV. Fourth Disclosure: Method of Allowing Handover Only when the UE Connects with a Network Through the Same PLMN When the UE performs a registration procedure through another access network for handover, a fourth disclosure of the present specification may handover a PDU session of the UE only when a 3GPP access network and a non-3GPP access network are located at the same PLMN. The fourth disclosure does not need additional indication and procedure as compared with other disclosures. However, according to the situation, the UE may not handover even if the handover is possible.

V. Fifth Disclosure: Method of Reporting Whether a Corresponding PDU Session can Handover During a Procedure of Establishing PDU Session According to the fifth disclosure, the network may transmit information directly indicating whether handover is possible or impossible instead of not reporting information on whether a PDU session is established in an HR scheme or an LBO scheme. In this case, the UE may determine whether to perform handover based on information indicating whether the handover is possible while the UE does not know whether the PDU session is established in the HR scheme or the LBO scheme. For example, the network may establish a plurality of PDU sessions by the same DNN. Among them, an SSC mode 1 based PDU session may indicate that handover is possible, and an SSC mode 2/3 based PDU session may indicate that the handover is impossible. In this case, the UE may handover only the SSC mode 1 based PDU session. In a case of the SSC mode 2, according to definition of the SSC mode, after an existing PDU session stops, a new PDU session may be established. In this case, the handover is not performed, a PDU session may stop through an existing access and a new PDU session may be established through a new access. Since a plurality of parallel PDU session may be established for a predetermined time in a case of the SSC mode 3, a second PDU session is established through a new access while maintaining the first PDU session through a previous access, after a traffic is moved through a newly created second PDU session, a previous first PDU session stops.

Alternatively, a PDU session created from the network is connected with a specific slice and a corresponding slice may be used in only a specific access, the network may report that the handover is impossible to the UE.

When using the method, when the UE previously completes registration through both accesses, the SMF may previously report whether the handover is possible to the UE. For example, it is assumed that the UE is registered in both of the 3GPP access and the non-3GPP access. In this case, if a current UE is registered in both of the 3GPP access and the non-3GPP access through the same AMF, the AMF may report that the all the UEs are registered through one AMF to the SMF. The SMF may report that the handover is possible in a PDU session establishment accept message by taking into consideration an SSC mode based on information from the AMF. If the UEs complete the registration through different AMFs, one AMF cannot know whether the UEs are registered in two accesses. Accordingly, in this case, the AMF send no information to the SMF. Since the SMF does not receive information indicating that the UE completes a registration through two accesses from the AMF, the SMF may add information indicating that the handover is impossible to a PDU session establishment accept message.

Figure 15:
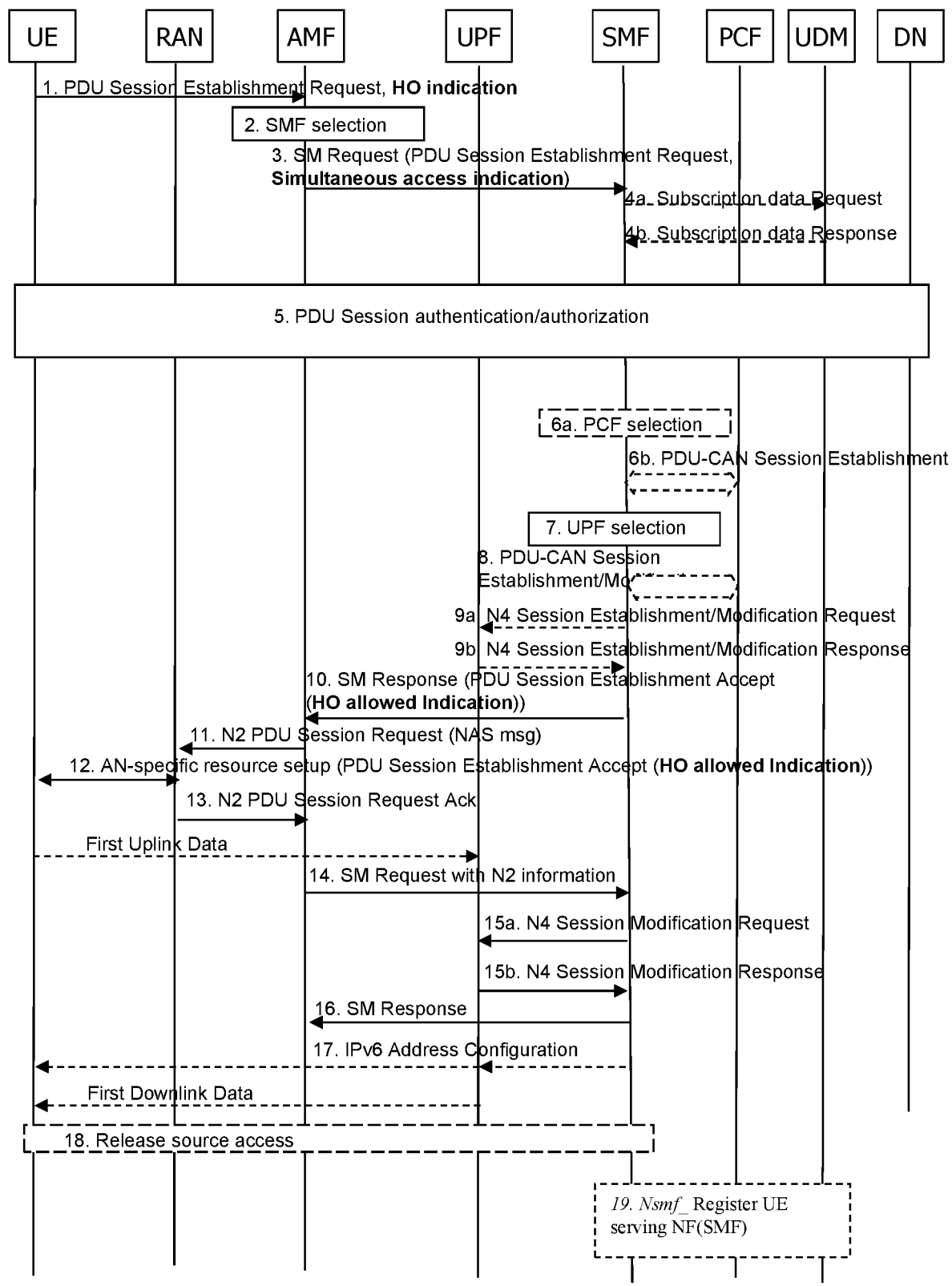
FIG. 15 is a flowchart illustrating a method of indicating whether a corresponding PDU session can perform HO during a PDU session establishment procedure.

FIG. 15 is a flowchart illustrating a method of indicating whether a corresponding PDU session can perform HO during a PDU session establishment procedure.

Referring to FIG. 15, when the UE transmits a PDU session establishment request message for handover during a procedure 1, the UE includes handover indication (e.g., HO indication) in order to report a message to be sent for handover to the AMF.

When the received message includes the HO indication, the AMF adds an indication (e.g., Simultaneous access indication) indicating whether the UE is simultaneously registered in a 3GPP access and a non-3GPP access through one AMF to a PDU session establishment request message of the procedure 3 to transmit the PDU session establishment request message the SMF.

During a procedure 10, the SMF may determine whether handover is possible based on the indication (e.g., Simultaneous access indication). Although there is no indication, the SMF may determine whether the handover is possible based on subscription information, UE ability information, and the like.

The above embodiment may be implemented by hardware. The above is described with reference to the accompanying drawings.

Figure 16:
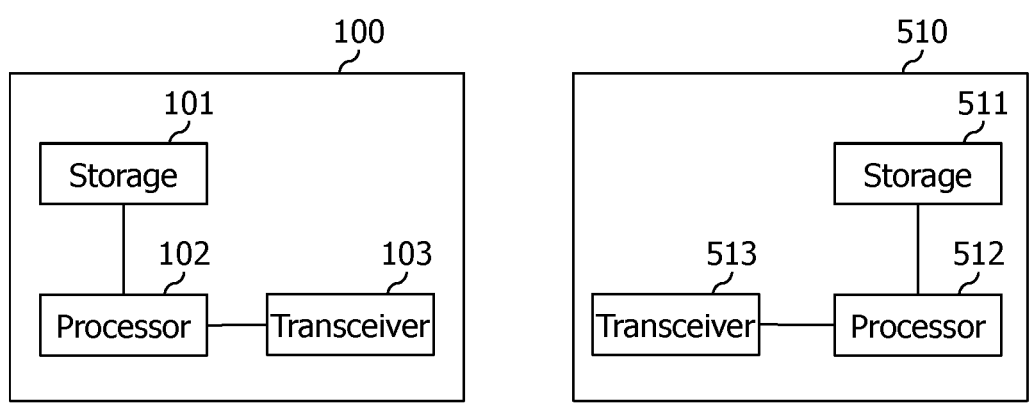
FIG. 16 is a block diagram illustrating a configuration of UE and a network according to an embodiment of the present invention.

FIG. 16 is a block diagram illustrating a configuration of UE and a network according to an embodiment of the present invention.

As shown in FIG. 16, the UE 100 includes a storage unit 101, a controller 120, and a transceiver 103. Further, the network node may include one of an AMF, an SMF, an NEF, and an AF. The network node may include a storage unit 511, a controller 512, and a transceiver 513.

The storage units store the above method.

The controllers control the storage units and the transceivers, respectively. In detail, the controllers execute the above methods stored in the storage units, respectively. Further, the controllers transmit the above signals through the transceiver.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for handling a packet data unit (PDU) session establishment procedure, performed by an access and mobility management function (AMF) entity, the method comprising:
receiving, from a user equipment (UE), a PDU session establishment request including an identifier of an existing PDU session;
obtaining a session management function (SMF) identifier corresponding to the identifier of the existing PDU session;
determining, based on the SMF identifier, whether to reject the PDU session establishment request; and
based on a determination to reject the PDU session establishment request, transmitting a message comprising a rejection cause to the UE,
wherein determining, based on the SMF identifier, whether to reject the PDU session establishment request comprises:
based on a determination that a SMF entity, corresponding to the SMF identifier, and the AMF entity belong to a same Public Land Mobile Network (PLMN), determining not to reject the PDU session establishment request.

2. The method of claim 1, wherein determining, based on the SMF identifier, whether to reject the PDU session establishment request further comprises:
based on a determination that the SMF entity corresponding to the SMF identifier belongs to a Home Public Land Mobile Network (HPLMN), determining not to reject the PDU session establishment request.

3. The method of claim 1, wherein the PDU session establishment request further comprises a request type, and wherein the request type indicates (i) an "initial request" to configure a new PDU session, or (ii) an "existing PDU session".

4. The method of claim 3, further comprising:
based on the request type indicating the "existing PDU session", requesting a movement of the existing PDU session between a 3rd Generation Partnership Project (3GPP) based access network and a non-3GPP based access network.

5. The method of claim 2, further comprising:
storing the identifier of the existing PDU session and the SMF identifier in association with each other.

6. The method of claim 1, wherein the SMF identifier comprises an identifier of a PLMN.

7. The method of claim 1, wherein the PDU session establishment request is determined to be rejected, based on a determination that (i) the SMF entity corresponding to the SMF identifier and the AMF entity do not belong to the same PLMN, and (ii) the SMF entity corresponding to the SMF identifier does not belong to a HPLMN.

8. An access and mobility management function (AMF) entity configured to handle a packet data unit (PDU) session establishment procedure, the AMF entity comprising:
a transceiver;
at least one processor; and
at least one computer memory operably connectable to the at least one processor and storing instructions that, when executed, cause the at least one processor to perform operations comprising:
receiving, from a user equipment (UE), a PDU session establishment request including an identifier of an existing PDU session;
obtaining a session management function (SMF) identifier corresponding to the identifier of the existing PDU session;
determining, based on the SMF identifier, whether to reject the PDU session establishment request; and
based on a determination to reject the PDU session establishment request, transmitting a message comprising a rejection cause to the UE,
wherein determining, based on the SMF identifier, whether to reject the PDU session establishment request comprises:
based on a determination that a SMF entity corresponding to the SMF identifier and the AMF entity belong to a same Public Land Mobile Network (PLMN), determining not to reject the PDU session establishment request.

9. The AMF entity of claim 8, wherein determining, based on the SMF identifier, whether to reject the PDU session establishment request further comprises:
based on a determination that the SMF entity corresponding to the SMF identifier belongs to a Home Public Land Mobile Network (HPLMN), determining not to reject the PDU session establishment request.

10. The AMF entity of claim 8, wherein the PDU session establishment request further comprises a request type, and wherein the request type indicates (i) an "initial request" to configure a new PDU session, or (ii) an "existing PDU session".

11. The AMF entity of claim 10, wherein the operations further include:

based on the request type indicating the "existing PDU session", requesting a movement of the existing PDU session between a 3rd Generation Partnership Project (3GPP) based access network and a non-3GPP based access network.

12. The AMF entity of claim 8, wherein the operations further include:
storing the identifier of the existing PDU session and the SMF identifier in association with each other.

13. The AMF entity of claim 8, wherein the SMF identifier comprises an identifier of a PLMN.

14. The AMF entity of claim 8, wherein the PDU session establishment request is determined to be rejected, based on a determination that (i) the SMF entity corresponding to the SMF identifier and the AMF entity do not belong to the same PLMN, and (ii) the SMF entity corresponding to the SMF identifier does not belong to a HPLMN.

15. A method for handling a packet data unit (PDU) session establishment procedure, performed by a user equipment (UE), the method comprising:
transmitting, to an access and mobility management function (AMF) entity, a PDU session establishment request including an identifier of an existing PDU session,
wherein the identifier of the existing PDU session is used by the AMF entity to obtain a session management function (SMF) identifier, and
wherein the SMF identifier is used by the AMF entity to determine whether to reject the PDU session establishment request; and
receiving a message comprising a rejection cause, based on that the AMF entity determines to reject the PDU session establishment request,
wherein the message comprising the rejection cause is not received, based on that the AMF entity determines that a SMF entity, corresponding to the SMF identifier, and the AMF entity belong to a same Public Land Mobile Network (PLMN).

16. The method of claim 15,
wherein the message comprising the rejection cause is not received, based on that the AMF entity determines that the SMF entity corresponding to the SMF identifier belongs to a Home Public Land Mobile Network (HPLMN).

17. The method of claim 15,
wherein the PDU session establishment request further comprises a request type, and
wherein the request type indicates (i) an "initial request" to configure a new PDU session, or (ii) an "existing PDU session".

18. The method of claim 17,
based on the request type indicating the "existing PDU session", the PDU session establishment request is used to request a movement of the existing PDU session between a 3rd Generation Partnership Project (3GPP) based access network and a non-3GPP based access network.

19. The method of claim 15,
wherein the identifier of the existing PDU session and the SMF identifier in association with each other by the AMF entity.

20. The method of claim 15, wherein the SMF identifier comprises an identifier of a PLMN.

* * * * *